(12) United States Patent
Shimura et al.

(10) Patent No.: US 10,440,285 B2
(45) Date of Patent: Oct. 8, 2019

(54) IMAGING APPARATUS AND IMAGING METHOD

(71) Applicant: OLYMPUS CORPORATION, Hachioji-shi, Tokyo (JP)

(72) Inventors: Kazuhiko Shimura, Hachioji (JP); Kazuo Kanda, Higashiyamato (JP); Yoshiyuki Fukuya, Sagamihara (JP); Nobuyuki Shima, Machida (JP); Shinya Takasumi, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 38 days.

(21) Appl. No.: 15/697,054

(22) Filed: Sep. 6, 2017

(65) Prior Publication Data
US 2018/0077332 A1 Mar. 15, 2018

(30) Foreign Application Priority Data

Sep. 9, 2016 (JP) .................................. 2016-176743

(51) Int. Cl.
| | |
|---|---|
| *H04N 5/355* | (2011.01) |
| *H04N 5/232* | (2006.01) |
| *H04N 5/235* | (2006.01) |
| *H04N 5/77* | (2006.01) |
| *H04N 9/804* | (2006.01) |

(52) U.S. Cl.
CPC ......... *H04N 5/2354* (2013.01); *H04N 5/2355* (2013.01); *H04N 5/23245* (2013.01); *H04N 5/232935* (2018.08); *H04N 5/232939* (2018.08); *H04N 5/35581* (2013.01); *H04N 5/772* (2013.01); *H04N 9/8042* (2013.01)

(58) Field of Classification Search
USPC .................. 382/273–274, 276, 284; 348/297
See application file for complete search history.

(56) References Cited

U.S. PATENT DOCUMENTS

| | | | | |
|---|---|---|---|---|
| 2011/0222793 A1* | 9/2011 | Ueda | .................... | H04N 5/2355 382/284 |
| 2013/0286254 A1* | 10/2013 | Watanabe | ............ | H04N 5/2355 348/239 |
| 2013/0293748 A1* | 11/2013 | Fukutomi | ............... | G06T 5/007 348/254 |
| 2013/0308012 A1* | 11/2013 | Fukutomi | .............. | H04N 1/407 348/229.1 |
| 2016/0227092 A1 | 8/2016 | Ikeda | | |

FOREIGN PATENT DOCUMENTS

JP 2015056807 A 3/2015

* cited by examiner

*Primary Examiner* — Dwayne D Bost
*Assistant Examiner* — Stephen M Brinich
(74) *Attorney, Agent, or Firm* — Holtz, Holtz & Volek PC

(57) ABSTRACT

An imaging apparatus includes an imaging unit, a first image processor, and a record processor. The imaging unit sequentially acquires image data groups comprising pieces of image data different in exposure conditions to generate HDR moving image frames. The first image processor subjects the pieces of the image data belonging to each of the image data groups to first composition processing, to generate HDR moving image data comprising HDR moving image frames. The record processor is configured to record image data for still images so that the pieces of the image data belonging to each of the image data groups are subjected to second composition processing different from the first composition processing, to generate HDR still image data.

8 Claims, 14 Drawing Sheets

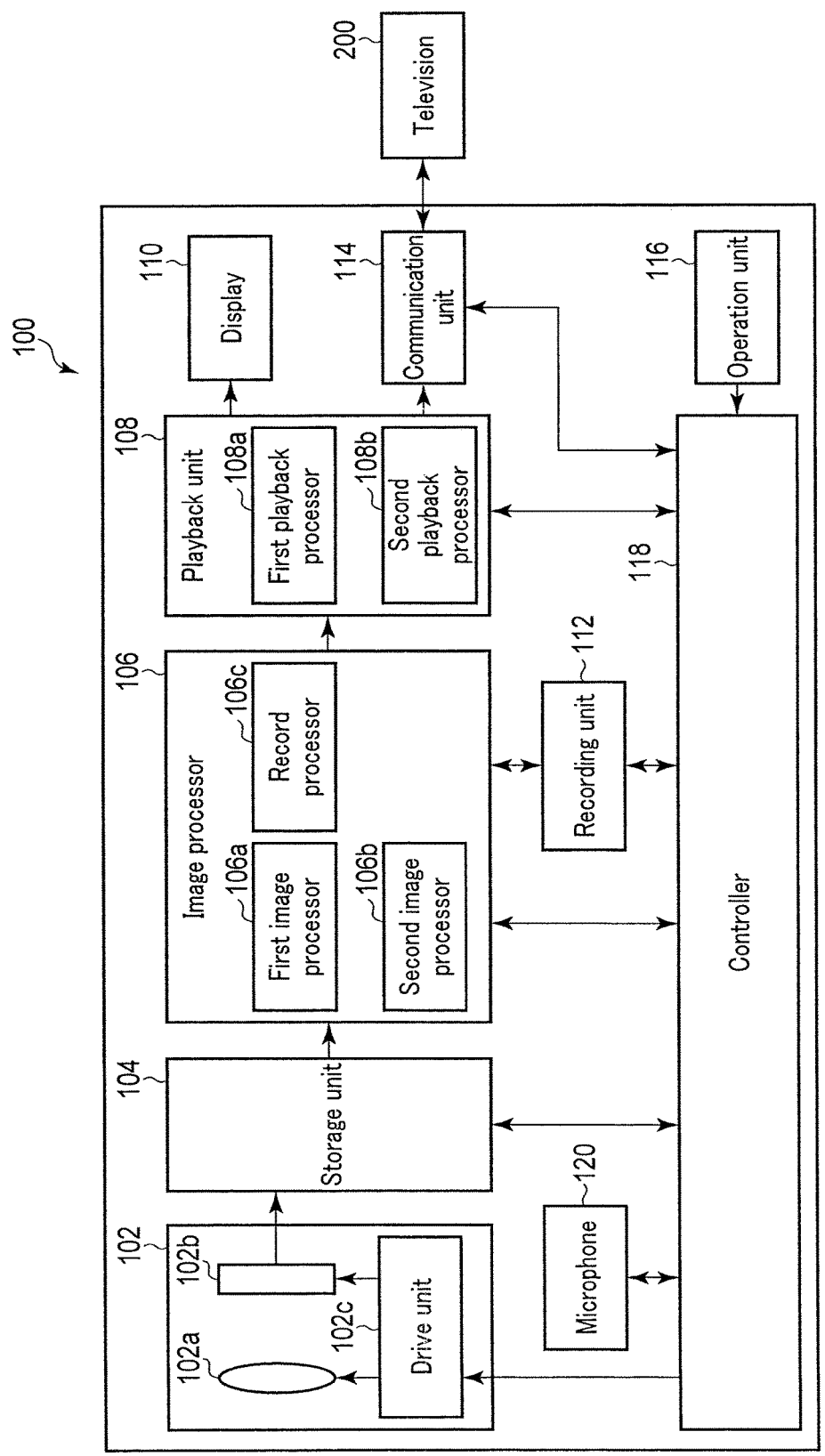
F I G. 1

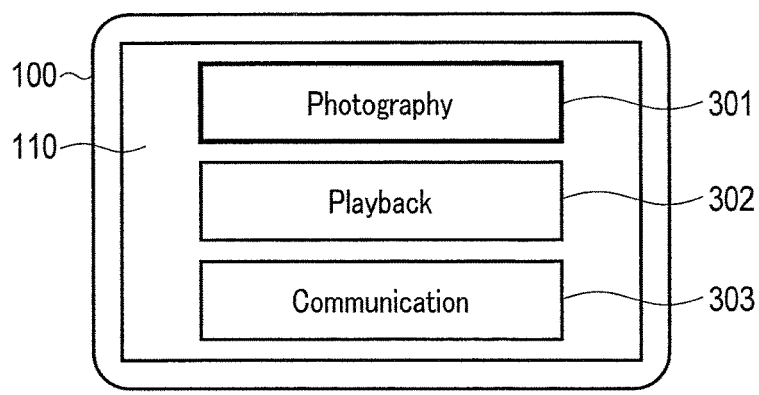
F I G. 3A
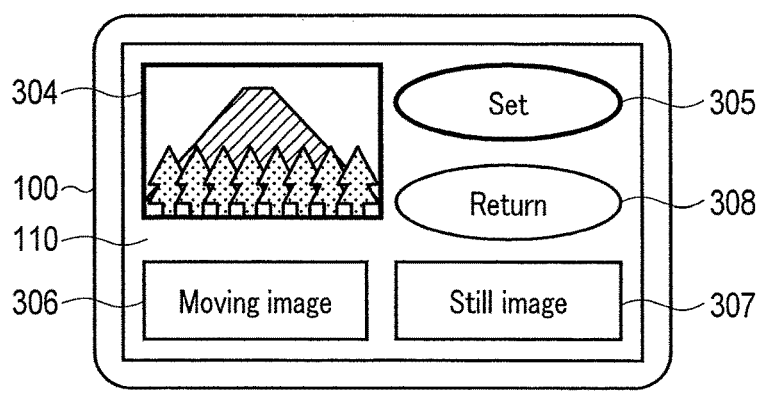
F I G. 3B
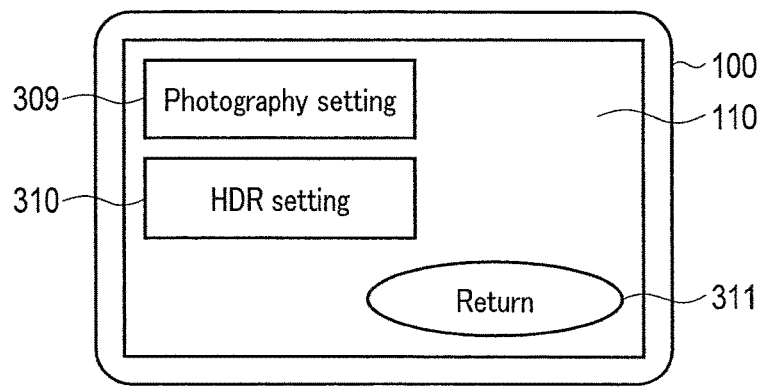
F I G. 3C

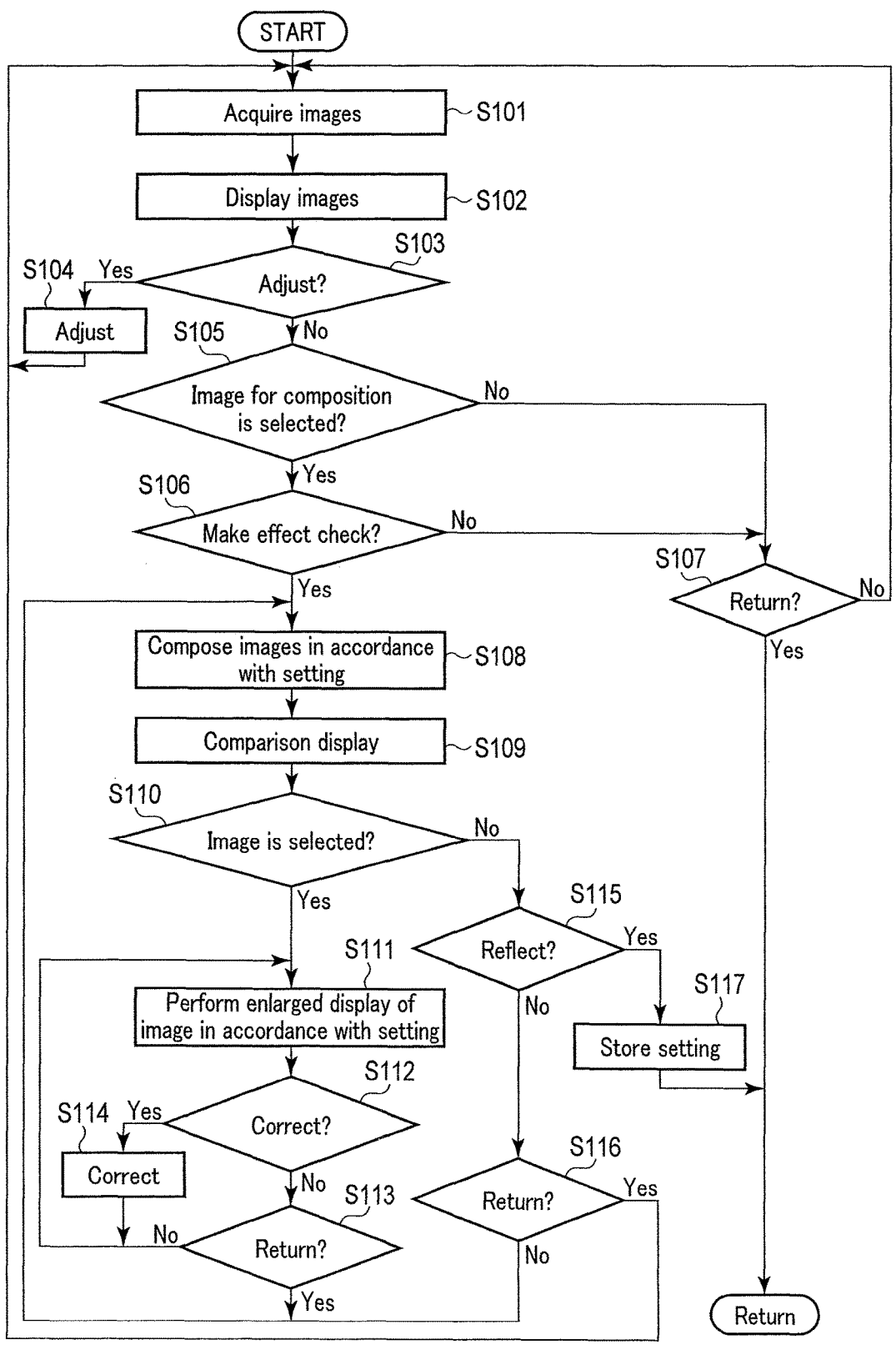
F I G. 4

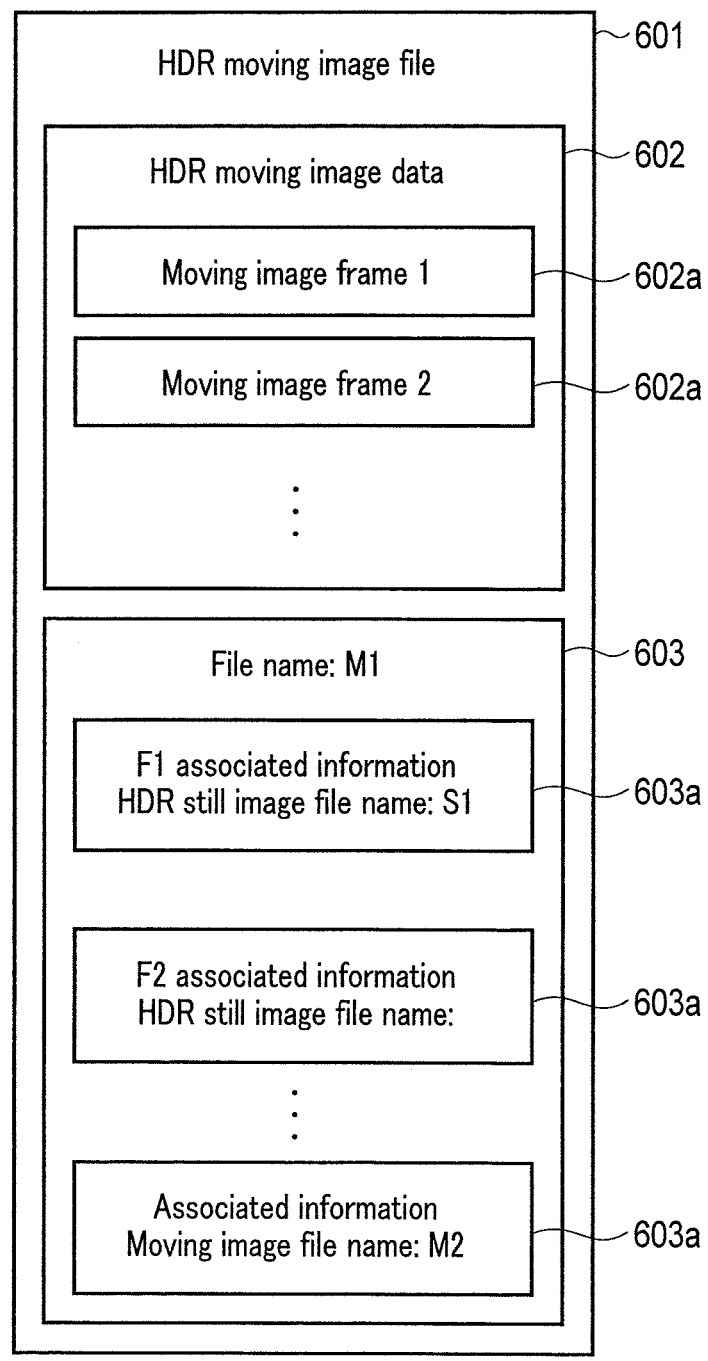
F I G. 8A

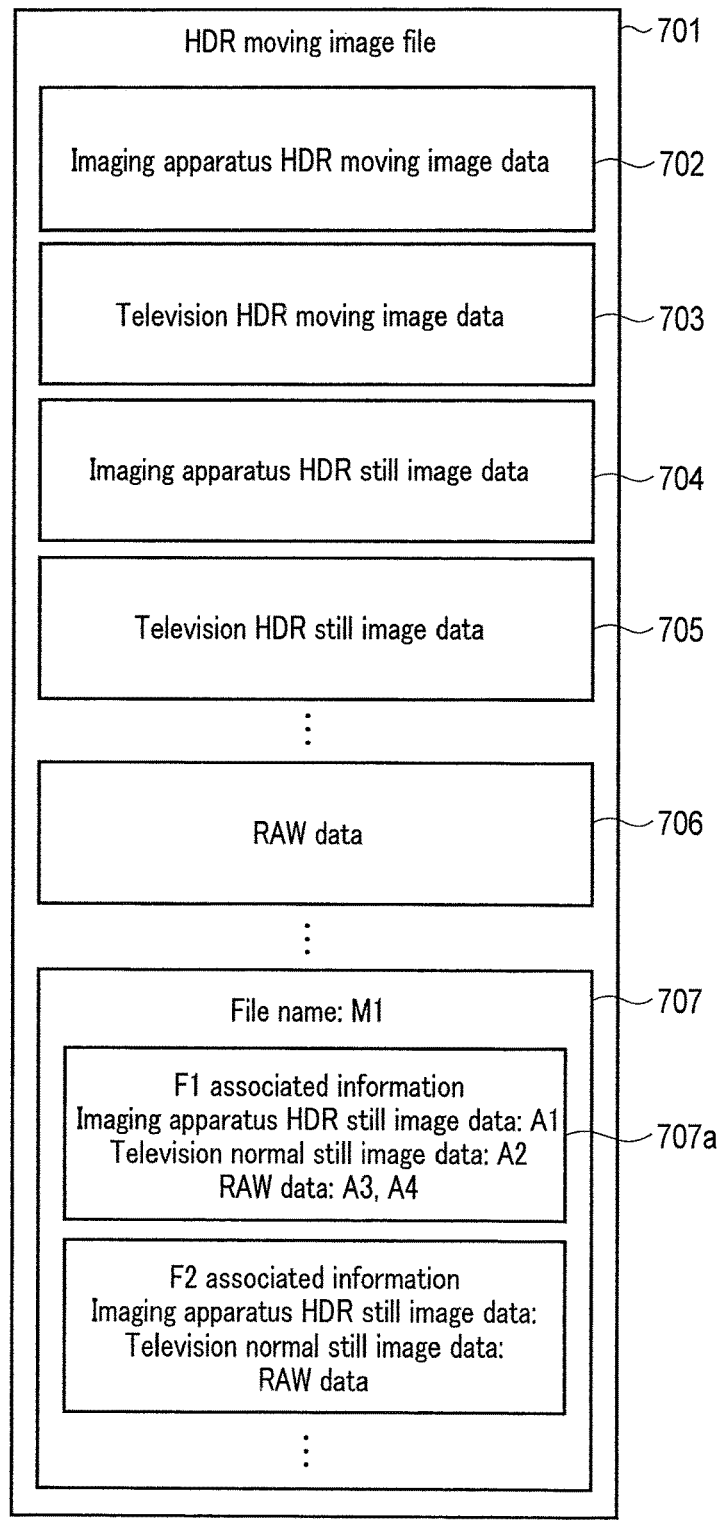
F I G. 9

IMAGING APPARATUS AND IMAGING METHOD

CROSS-REFERENCE TO RELATED APPLICATIONS

This application is based upon and claims the benefit of priority from the prior Japanese Patent Application No. 2016-176743, filed Sep. 9, 2016, the entire contents of which are incorporated herein by reference.

BACKGROUND OF THE INVENTION

1. Field of Invention

The present invention relates to an imaging apparatus and an imaging method.

2. Description of Related Art

Recent imaging apparatuses are each connectable to a television by wired communication or wireless communication. Thus, a user can watch images acquired by the imaging apparatus in a large screen of the television.

Furthermore, in recent years, there are being increased televisions compatible with high dynamic range (HDR) display which permits the display in a dynamic range wider than in original specifications. On the other hand, some of recent imaging apparatuses have each an HDR image recording function to acquire images in a dynamic range wider than in the original specifications of the imaging apparatuses by composing images different in exposure conditions. Such imaging apparatuses having the HDR image recording function can become imaging apparatuses which can provide attractive contents to televisions compatible with the HDR display.

Among the imaging apparatuses having the HDR image recording function, for example, an imaging apparatus suggested in Jpn. Pat. Appln. KOKAI Publication No. 2015-56807 composes images having different exposure conditions obtained during the recording of an HDR moving image when there is given an instruction of a still image photography during the recording of the HDR moving image, thereby recording an HDR still image.

BRIEF SUMMARY OF THE INVENTION

According to a first aspect of the invention, there is provided an imaging apparatus comprising: an imaging unit which sequentially acquires image data groups comprising pieces of image data different in exposure conditions to generate HDR moving image frames; a first image processor which subjects the pieces of the image data belonging to each of the image data groups to first composition processing, to generate HDR moving image data comprising HDR moving image frames; and a record processor configured to record image data for still images so that the pieces of the image data belonging to each of the image data groups are subjected to second composition processing different from the first composition processing, to generate HDR still image data.

According to a second aspect of the invention, there is provided an imaging apparatus comprising: an imaging unit which sequentially acquires image data groups comprising pieces of image data different in exposure conditions to generate HDR moving image frames; a first image processor which subjects the pieces of the image data belonging to each of the image data groups to first composition processing, to generate HDR moving image data comprising HDR moving image frames; and a second image processor which subjects pieces of image data belonging to each of the image data groups or pieces of image data that do not belong to the image data groups to second composition processing different from the first composition processing, to generate HDR still image data.

According to a third aspect of the invention, there is provided an imaging apparatus comprising: an imaging unit which sequentially acquires pieces of image data groups comprising image data different in exposure conditions to generate HDR moving image frames; a first image processor which subjects the pieces of the image data belonging to each of the image data groups to first composition processing, to generate HDR moving image data comprising HDR moving image frames; and a selector which selects an imaging mode configured to subject the pieces of the image data belonging to each of the image data groups to second composition processing different from the first composition processing, to generate HDR still image data, or an imaging mode configured to subject the pieces of the image data belonging to each of the image data groups to composition processing similar to the first composition processing, to generate HDR still image data.

According to a fourth aspect of the invention, there is provided an imaging method comprising: sequentially acquiring, by an imaging unit, image data groups comprising pieces of image data different in exposure conditions to generate HDR moving image frames; subjecting the pieces of the image data belonging to each of the image data groups to first composition processing, to generate HDR moving image data comprising HDR moving image frames; and recording image data for still images so that the pieces of the image data belonging to each of the image data groups are subjected to second composition processing different from the first composition processing, to generate HDR still image data.

According to a fifth aspect of the invention, there is provided an imaging method comprising: sequentially acquiring, by an imaging unit, image data groups comprising pieces of image data different in exposure conditions to generate HDR moving image frames; subjecting the pieces of the image data belonging to each of the image data groups to first composition processing, to generate HDR moving image data comprising HDR moving image frames; and subjecting the pieces of the image data belonging to each of the image data groups or image data that do not belong to the image data groups to second composition processing different from the first composition processing, to generate HDR still image data.

According to a sixth aspect of the invention, there is provided an imaging method comprising: sequentially acquiring, by an imaging unit, image data groups comprising pieces of image data different in exposure conditions to generate HDR moving image frames; subjecting the pieces of the image data belonging to each of the image data groups to first composition processing, to generate HDR moving image data comprising HDR moving image frames; and selecting an imaging mode configured to subject the pieces of the image data belonging to each of the image data groups to second composition processing different from the first composition processing, to generate HDR still image data, or an imaging mode configured to subject the pieces of the image data belonging to each of the image data groups to composition processing similar to the first composition processing, to generate HDR still image data.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of one example of an imaging apparatus according to one embodiment of the present invention;

FIG. 3A is a diagram showing a display example of operation mode icons;

FIG. 3B is a diagram showing a display example of through-image display and photography mode icons;

FIG. 3C is a diagram showing a display example of a setting screen;

FIG. 4 is a flowchart showing processing of an effect check;

FIG. 8A is a diagram showing the structure of an imaging apparatus HDR moving image file;

FIG. 9 is a diagram showing the structure of an HDR moving image file in the case where HDR moving image data and HDR still image data are recorded in one file;

DETAILED DESCRIPTION OF THE INVENTION

Figure 2A:
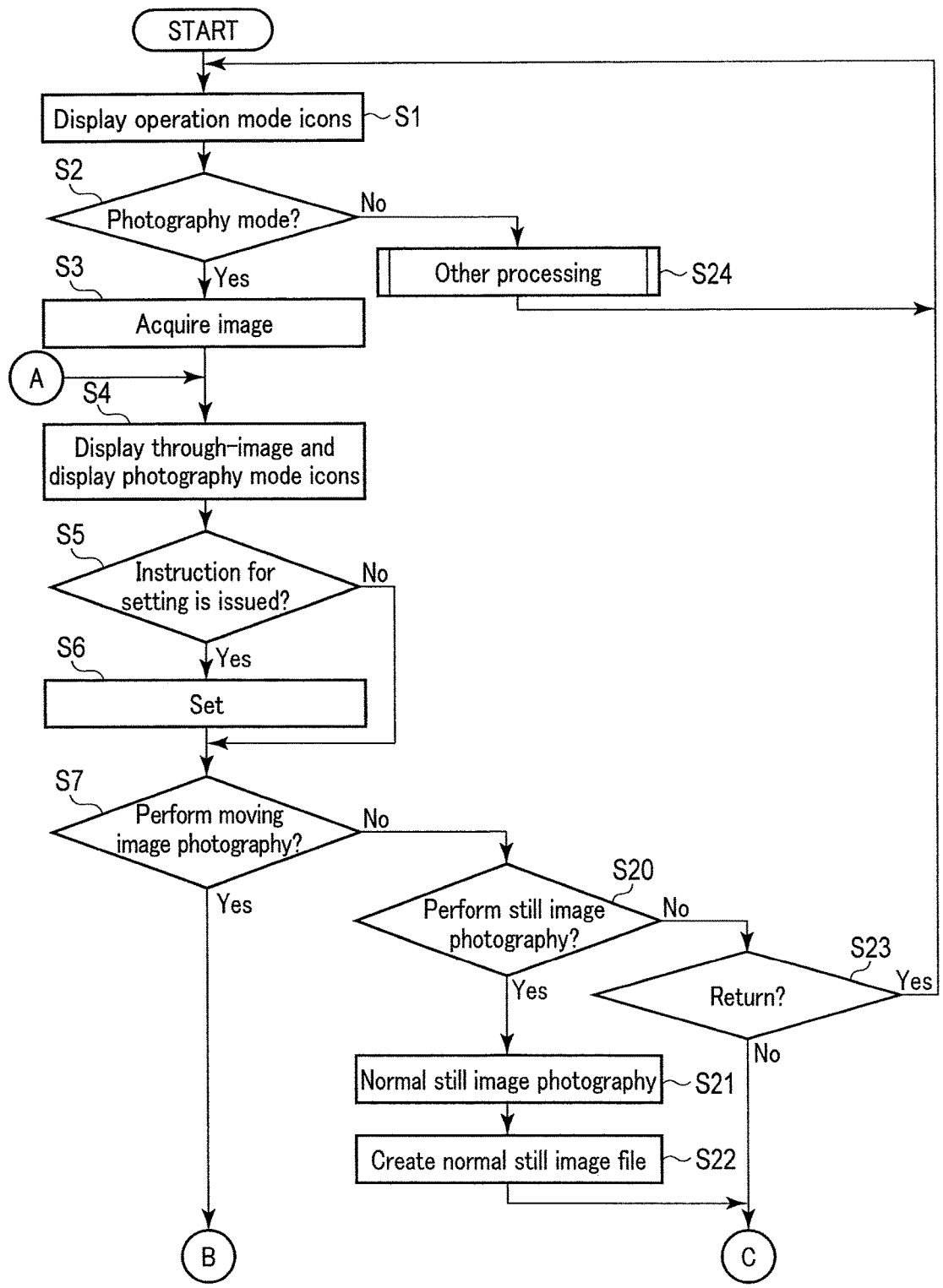
FIG. 2A is a flowchart showing the main processing of the imaging apparatus according to one embodiment of the present invention.

An embodiment of the present invention will be hereinafter described with reference to the drawings. FIG. 1 is a block diagram showing the configuration of one example of an imaging apparatus according to one embodiment of the present invention. An imaging apparatus 100 shown in FIG. 1 includes various devices having imaging functions, such as a digital camera, a smartphone, and a mobile telephone having a camera function. The imaging apparatus 100 shown in FIG. 1 includes an imaging unit 102, a storage unit 104, an image processor 106, a playback unit 108, a display 110, a recording unit 112, a communication unit 114, an operation unit 116, a controller 118, and a microphone 120. Here, each block of the imaging apparatus 100 is formed by, for example, a combination of a hardware and a software. Each block of the imaging apparatus 100 does not need to be formed by a single hardware or software, and may be formed by hardwares and softwares.

The imaging unit 102 includes an imaging optical system 102a, an imaging element 102b, and a drive unit 102c. The imaging optical system 102a includes an aperture, lenses, and others, and allows a light flux from an unshown subject to enter the imaging element 102b. The imaging optical system 102a also includes a focus lens to adjust a focus state. The imaging element 102b includes, for example, a CMOS image sensor or a CCD image sensor, and images a target and acquires image data (RAW data) regarding the target. The imaging element 102b may include phase difference detection pixels so that the distance to the photography target can be detected. The imaging element 102b according to the present embodiment may be configured to be movable in a plane orthogonal to an optical axis of the imaging optical system 102a. The drive unit 102c drives the focus lens of the imaging optical system 102a in its optical axis direction, or drives the imaging element 102b, under the control of the controller 118.

The storage unit 104 is, for example, a DRAM, and transitorily stores image data acquired by the imaging unit 102.

The image processor 106 subjects, to image processing, the image data acquired by the imaging unit 102 and then stored in the storage unit 104. The image processor 106 includes a first image processor 106a, a second image processor 106b, and a record processor 106c.

The first image processor 106a subjects the image data stored in the storage unit 104 to image processing regarding the generation of moving image data. Here, the moving image data according to the present embodiment includes normal moving image data, imaging apparatus HDR moving image data, and television HDR moving image data. The normal moving image data is image data in which each of the image data acquired by the imaging unit 102 is a moving image frame, and is image data having a gradation number (e.g. 8-bit gradation number) equal to the display gradation number of the display 110. The gradation number here indicates which bit of data constitutes the image data. For example, the gradation number of 8 bits can express brightness of 256 gradations. The imaging apparatus HDR moving image data is moving image data having a wide dynamic range in which each of composite image data formed by the composition of image data different in exposure conditions acquired by the imaging unit 102 is a moving image frame, and is moving image data having a gradation number (e.g. 8-bit gradation number) equal to the display gradation number of the display 110. The television HDR moving image data is moving image data having a wide dynamic range in which each of composite image data formed by the composition of image data different in exposure conditions acquired by the imaging unit 102 is a moving image frame, and is moving image data having a gradation number (e.g. 10-bit gradation number) equal to the display gradation number of a television 200 capable of HDR display. Naturally, there is a difference in how the gradation is thought between photography in which an image is put in a certain amount of data and display which can increase the change of brightness as needed, but the gradation is expressed as uniform here for simplicity in the sense that the information amount of brightness is increased compared to normal. To generate the normal moving image data, the first image processor 106*a* performs basic image processing necessary to generate moving image data, such as white balance correction processing, gradation conversion, and color correction. On the other hand, to generate the HDR moving image data, the first image processor 106*a* performs first composition processing including basic image processing necessary to generate moving image data, such as white balance correction processing, gradation conversion, and color correction, and processing to increase the dynamic range and the information amount by composing image data different in exposure conditions. Because smoothness is required, high-speed processing which can sequentially adapt to each frame is needed.

The second image processor 106*b* subjects the image data stored in the storage unit 104 to image processing regarding the generation of still image data. Here, the still image data according to the present embodiment includes normal still image data, imaging apparatus HDR still image data, and television HDR still image data. The normal still image data is still image data generated from one image data acquired by the imaging unit 102, and is still image data having a gradation number (e.g. 8-bit gradation number) equal to the display gradation number of the display 110. The imaging apparatus HDR still image data is still image data having a wide dynamic range which is formed by composing image data different in exposure conditions acquired by the imaging unit 102, and is still image data having a gradation number (e.g. 8-bit gradation number) equal to the display gradation number of the display 110. Although the gradation number is written in a simple form here, gradation is not necessarily exactly the same because of adjustments suitable to the characteristics of a display system. The gradation number has only to be a data amount corresponding to the dynamic range of the display system. The television HDR still image data is still image data having a wide dynamic range which is formed by composing image data different in exposure conditions acquired by the imaging unit 102, and is still image data having a gradation number (e.g. 10-bit gradation number) equal to the display gradation number of the television 200 capable of HDR display. To generate the normal still image data, the second image processor 106*b* performs basic image processing necessary to generate still image data, such as white balance correction processing, gradation conversion, and color correction. On the other hand, to generate the HDR still image data, the second image processor 106*b* performs basic image processing necessary to generate still image data, such as white balance correction processing, gradation conversion, and color correction, and processing to increase the dynamic range by composing image data different in exposure conditions. The still image data is appreciated in detail as a picture, and may therefore be subjected to adaptation processing optimized according to places. The still image data may also be corrected to be optimum at the time of printing. Such processing corresponds to limited frames, and may therefore be time-consuming processing. Particularly when an HDR still image is recorded during HDR moving image photography, the second image processor 106*b* performs second composition processing different from the first composition processing. For example, together with the composition processing, the second image processor 106*b* performs, as the second composition processing, processing such as varying the composition ratio between the composition of image data different in exposure conditions and the composition of HDR moving images, enhancing the contrast of image data before and after composition, enhancing saturation, and combining the above to provide certain visual effects. As a result of this second composition processing, an HDR still image having an image expression different from that of HDR moving images can be generated. In moving images, mostly, gradations of details are not cared about if the images have accurate motion, and what is seen has only to be speedily and smoothly reproduced as it is. In contrast, the still image is required to be a work which can be appreciated in detail as a picture. Therefore, the still image needs to be an HDR image having expressions suited to the still image in contrast to moving images. In particular, the moving images preferably have frame expressions originating from image processing for smooth response and transition in a constantly changing situation, but the still image obtained during the response and transition needs to have an appropriate expression by itself regardless of the preceding and subsequent frames. When such a situation is considered, it goes without saying that an HDR still image having an expression different from that of HDR moving images is important. It is possible to have expressions appropriate for the still image by changing composition without changing the image before composition. While the still image may also be intended for printing, having characteristics suited to the characteristics of a printer, for example, is also important, and it is also possible to meet such needs.

The record processor 106*c* performs processing to generate an image file for recording from the image data generated by the first image processor 106*a* or the second image processor 106*b*. For example, the record processor 106*c* compresses the moving image data in a predetermined moving image compression scheme such as an H.264 scheme, and provides predetermined tag information to the compressed moving image data to generate a moving image file. Alternatively, for example, the record processor 106*c* compresses the still image data in a predetermined still image compression scheme such as a JPEG scheme, and provides predetermined tag information to the compressed still image data to generate a still image file. Here, the record processor 106*c* performs processing to associate the still image file with the moving image file when the still image file is generated during moving image photography. For example, the record processor 106*c* records, as tag information, information (e.g. the file name of an associated file) to associate the still image file with the moving image file. When the still image file is generated from the HDR still image data generated during the HDR moving image photography, the record processor 106*c* records, in a RAW format, the image data used for the composition of the HDR still image data. When this RAW data is recorded, the HDR still image data having an image expression different from that of the already recorded HDR still image data can be generated in the following editing. Consequently, it is possible to obtain a still image which is a work that can be appreciated in detail as a picture owing to the shading, contrast, and color reproduction appropriate for scenes and targets. In particular, the moving images preferably have frame expressions originating from image processing for smooth response and transition in a constantly changing situation. In contrast, the still image obtained during photography for moving images needs to have an appropriate expression by itself regardless of the preceding and subsequent frames. When such a situation is considered, it goes without saying that such editing is important. Moreover, an associating tag or the like makes it possible to search for a still image while appreciating moving images.

The playback unit 108 performs processing to play back the image data generated by the image processor 106. The playback unit 108 includes a first playback processor 108a, and a second playback processor 108b.

The first playback processor 108a performs processing to play back the moving image data in the display 110 or the television 200. For example, the first playback processor 108a inputs the moving image data generated in the first image processor 106a to the display 110 so that images will be displayed in the display 110. The first playback processor 108a sends the moving image data generated in the first image processor 106a to the television 200 via the communication unit 114 so that images will be displayed in the television 200. When the image data is compressed, the first playback processor 108a also decompresses the compressed image data.

The second playback processor 108b performs processing to play back the still image data in the display 110 or the television 200. For example, the second playback processor 108b inputs the still image data generated in the second image processor 106b to the display 110 so that images will be displayed in the display 110. The second playback processor 108b sends the still image data generated in the second image processor 106b to the television 200 via the communication unit 114 so that images will be displayed in the television 200. When the image data is compressed, the second playback processor 108b also decompresses the compressed image data.

The display 110 is, for example, a liquid crystal display or an organic EL display, and displays various images such as images based on the image data input from the playback unit 108.

The recording unit 112 comprises, for example, a flash ROM. Image files generated in the record processor 106c of the image processor 106 are recorded in the recording unit 112. Various programs used to control the imaging apparatus 100 may also be recorded in the recording unit 112.

The communication unit 114 performs processing to mediate a communication between the imaging apparatus 100 and the television 200 which is an external display device. The communication unit 114 mediates the communication between the imaging apparatus 100 and the television 200, for example, by HDMI. The communication unit 114 may mediate the communication between the imaging apparatus 100 and the television 200 by wireless communication such as WiFi. The communication unit 114 may also be configured to be able to communicate with devices other than the external display device.

The operation unit 116 is an operational component for a user to operate the imaging apparatus 100. The operation unit 116 includes, for example, a release button, a moving image button, a setting button, a selection key, an electric power button, a touch panel, and others. The release button is an operational component to issue an instruction for still image photography. The moving image button is an operational component to instruct to start or end moving image photography. The setting button is an operational component to display a setting screen for the imaging apparatus 100. The selection key is an operational component to select and decide an item on, for example, the setting screen. The electric power button is an operational component to turn on or off the electric power of the imaging apparatus 100. The touch panel is provided integrally with a display screen of the display 110, and detects a user's touch operation on the display screen. The touch panel may be capable of operations equivalent to those of the release button, the moving image button, the setting button, the selection key, and the electric power button described above. Moreover, the operation unit 116 may also have other operational components in addition to the operational components described above.

The controller 118 is a control circuit such as a CPU and an ASIC, and has overall control of the operation of the imaging apparatus 100. Functions equivalent to those of the controller 118 may be enabled by a software, or may be enabled by a combination of a hardware and a software. Some of the functions of the controller 118 may be provided separately from the controller 118.

The microphone 120 acquires input sound after converting the sound into an electric signal.

The television 200 which is an external display device displays, for example, television images. The television 200 also displays images on the basis of the image data transferred from the communication unit 114. Here, the television 200 is configured to be capable of the HDR display. The scheme of the HDR display in the television 200 is not limited to a particular scheme.

Figure 2B:
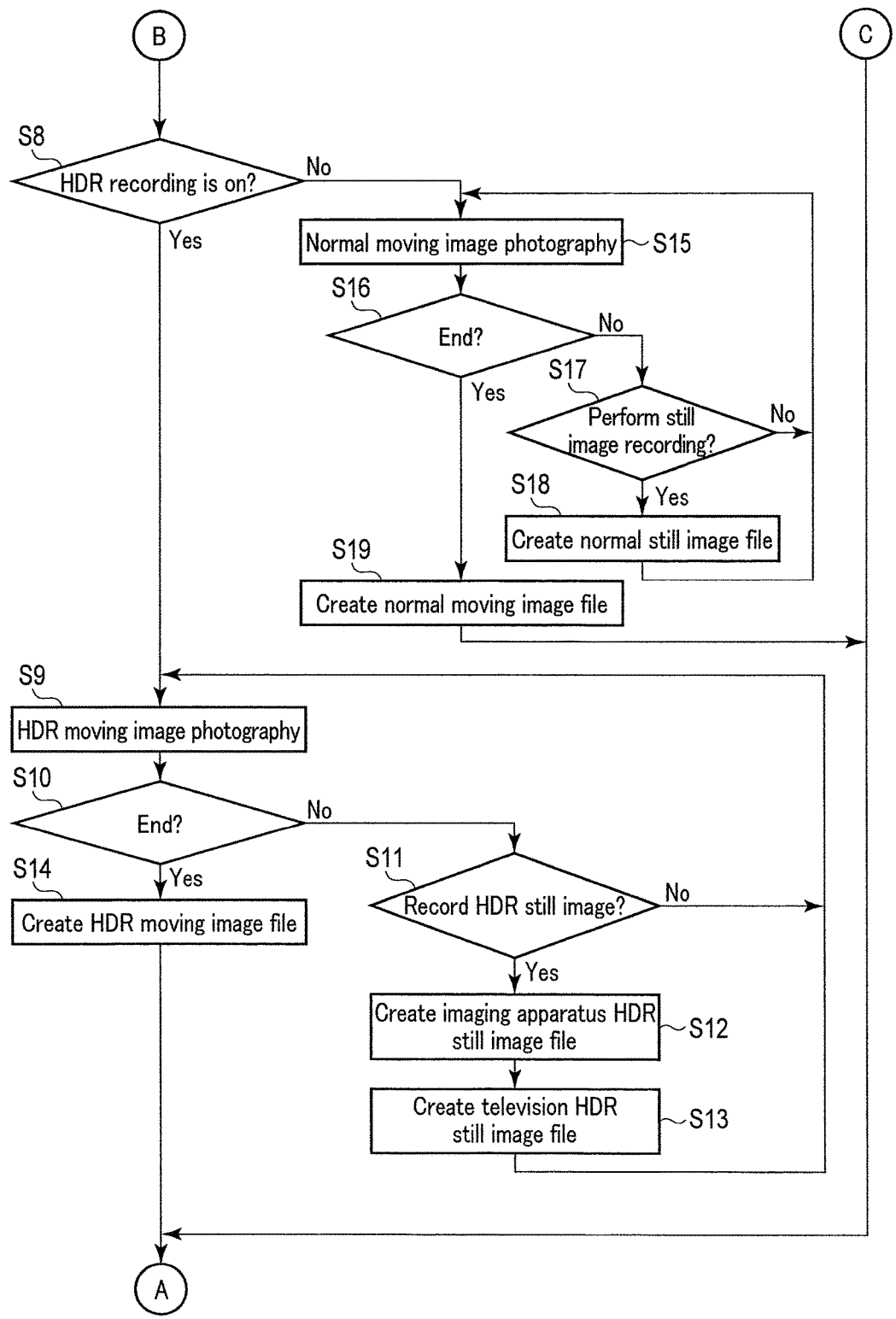
FIG. 2B is a flowchart showing the main processing of the imaging apparatus according to one embodiment of the present invention.

Now, the operation of the imaging apparatus according to the present embodiment is described. FIG. 2A and FIG. 2B are flowcharts showing the main processing of the imaging apparatus according to the present embodiment. The processing in FIG. 2A and FIG. 2B is performed mainly by the controller 118.

The processing in FIG. 2A and FIG. 2B is started when the electric power supply is turned on. In step S1, the controller 118 instructs the playback unit 108 to display operation mode icons on the display 110 for the user to select an operation mode of the imaging apparatus 100. In response to this instruction, the playback unit 108 displays, for example, a photography icon 301, a playback icon 302, and a communication icon 303 shown in FIG. 3A. The photography icon 301 is an icon for the user to instruct to switch the operation mode of the imaging apparatus 100 to a photography mode. The playback icon 302 is an icon for the user to instruct to switch the operation mode of the imaging apparatus 100 to a playback mode. The communication icon 303 is an icon for the user to instruct to switch the operation mode of the imaging apparatus 100 to a communication mode. Icons corresponding to operation modes other than the photography icon 301, the playback icon 302, and the communication icon 303 may be displayed. Otherwise, the icon display shown in FIG. 3A may not be performed. In this case, for example, when the electric power supply is turned on, the imaging apparatus 100 may enter an operation mode immediately before the electric power supply off, or enter a predetermined operation mode among the photography mode, the playback mode, and the communication mode.

In step S2, the controller 118 judges whether or not the current operation mode is the photography mode. That is, the controller 118 judges whether or not the current operation mode is the photography mode, by judging which icon is selected by the user. When it is judged in step S2 that the operation mode of the imaging apparatus 100 is the photography mode, the processing proceeds to step S3. When it is judged in step S2 that the operation mode of the imaging apparatus 100 is not the photography mode, the processing proceeds to step S24.

In step S3, the controller 118 causes the imaging unit 102 to perform imaging to acquire image data for through-image display. In step S4, the controller 118 performs the through-image display. As the through-image display, the controller 118 causes the image processor 106 to perform signal processing. Accordingly, the image processor 106 subjects the image data acquired in the imaging unit 102 and then stored in the storage unit 104 to the image processing (the white balance correction, the gradation conversion, the color correction, and others) necessary for the through-image display to generate through-image data. After the generation of the through-image data, the playback unit 108 sequentially displays through-images 304 based on the generated through-image data on the display 110 as shown in FIG. 3B. The playback unit 108 also displays, for example, a setting icon 305, a moving image photography icon 306, a still image photography icon 307, and a return icon 308 shown in FIG. 3B in, for example, a display region different from a display region of the through-images 304. The setting icon 305 is an icon for the user to issue a setting instruction. The moving image photography icon 306 is an icon for the user to instruct to start or end moving image photography. The still image photography icon 307 is an icon for the user to issue an instruction for still image photography. The return icon 308 is an icon for the user to instruct to end the photography mode. These icons for the photography modes may be displayed over the through-images 304. Icons other than the setting icon 305, the moving image photography icon 306, the still image photography icon 307, and the return icon 308 may be displayed as icons for the photography modes.

In step S5, the controller 118 judges whether or not the user has instructed to set the imaging apparatus 100. For example, when the user has selected the setting icon 305 or operated the setting button, it is judged that a setting instruction has been issued. When it is judged in step S5 that the setting instruction has been issued, the processing proceeds to step S6. When it is judged in step S5 that the setting instruction has not been issued, the processing proceeds to step S7.

In step S6, the controller 118 instructs the playback unit 108 to display the setting screen. In response to this instruction, the playback unit 108 displays, for example, the setting screen shown in FIG. 3C on the display 110. After the display of the setting screen, the controller 118 changes various settings in accordance with the user's operation on the setting screen. After the end of the setting on the setting screen, the processing proceeds to step S7. In the example of FIG. 3C, a photography setting icon 309, an HDR setting icon 310, and a return icon 311 are displayed on the setting screen. The photography setting icon 309 is an icon for the user to perform various settings at the time of photography. By selecting the photography setting icon 309, the user can set exposure conditions at the time of photography (set a shutter speed and an aperture), set recorded image quality at the time of photography, and others. The HDR setting icon 310 is an icon for the user to perform various settings regarding an HDR recording mode. By selecting the HDR setting icon 310, the user can set the on/off of the HDR recording mode, set the recording timing for the HDR still image during moving image photography, and make an effect check to perform setting regarding the composition processing of the HDR still image. The return icon 311 is an icon for the user to instruct to end the display of the setting screen.

The effect check is described below. FIG. 4 is a flowchart showing processing of the effect check. In the effect check, the user can perform various settings regarding the HDR still image data generated during the moving image photography while actually checking the HDR still image. While the still image may also be intended for printing, having characteristics suited to the characteristics of a printer, for example, is also important, and it is also possible to meet such needs.

In step S101, the controller 118 acquires image data for the effect check. In the effect check in the photography mode, the controller 118 controls the imaging unit 102 so that an image data group comprising image data different in exposure conditions will be acquired. In the processing in step S101 immediately after the execution of the processing of the effect check, the number of times of imaging and the exposure difference of the respective image data are fixed values. For example, the number of times of imaging is three, and the following imaging is performed: imaging under a condition of normal exposure (e.g. an exposure condition in which the exposure amount of a subject is a correct exposure amount), imaging under a condition of overexposure (an exposure condition in which the exposure amount of the subject is an exposure amount greater than the correct exposure amount), and imaging under a condition of underexposure (an exposure condition in which the exposure amount of the subject is an exposure amount smaller than the correct exposure amount). An exposure difference between the normal exposure, the overexposure, and the underexposure is, for example, one step.

Figure 5A:
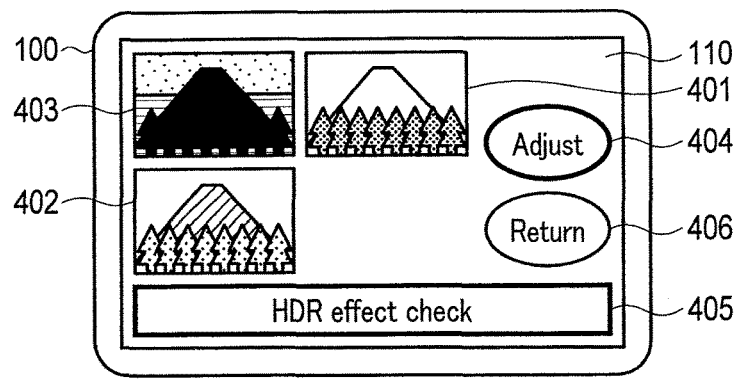
FIG. 5A is a diagram showing an example of display of a list of image data.

In step S102, the controller 118 controls the playback unit 108 to display a list of the acquired image data on the display 110. In response to this instruction, the playback unit 108 displays reduced images 401, 402, and 403 of the image data on the display 110, for example, as shown in FIG. 5A. Then the processing proceeds to step S103. Here, the reduced image 401 is a reduced image of the image data obtained by the imaging under the condition of the normal exposure, the reduced image 402 is a reduced image of the image data obtained by the imaging under the condition of the overexposure, and the reduced image 403 is a reduced image of the image data obtained by the imaging under the condition of the underexposure. Further, the playback unit 108 displays, for example, an adjustment icon 404, an HDR effect check icon 405, and a return icon 406. The adjustment icon 404 is an icon for the user to adjust HDR composition processing. The HDR effect check icon 405 is an icon for the user to check the result of the HDR composition processing. The return icon 406 is an icon for the user to instruct to end the effect check processing.

In step S103, the controller 118 judges whether or not make an adjustment. For example, it is judged that an adjustment will be made when the user has selected the adjustment icon 404. When it is judged in step S103 that an adjustment will be made, the processing proceeds to step S104. When it is judged in step S103 that an adjustment will not be made, the processing proceeds to step S105.

In step S104, the controller 118 makes an adjustment regarding the HDR composition processing in the effect check in accordance with the user's operation. In this adjustment, the user can adjust the number of pieces of image data for use in the HDR composition processing performed in the effect check, the exposure difference of the image data, and others. After the end of the adjustment, the processing returns to step S101. Here, when image data need to be again acquired due to the adjustment, for example, when the number of pieces of image data for use in the HDR composition processing is more than three and when there is a change in the exposure difference of the image data, image data are again acquired in step S101, and the display in step S102 is updated. The contents of the adjustments including the number of pieces of image data for use in the HDR composition processing and the exposure difference of the image data may also be reflected at the time of the following HDR moving image photography.

In step S105, the controller 118 judges whether or not the image data for use in the HDR composition processing has been selected by the user. For example, when the display shown in FIG. 5A is performed, the user can select the image data for use in the HDR composition processing by touching the reduced images 401, 402, and 403. In step S105, when the number of pieces of image data necessary for the HDR composition processing are selected by the user, it is judged that the image data for use in the HDR composition processing have been selected by the user. When it is judged in step S105 that the image data for use in the HDR composition processing have been selected by the user, the processing proceeds to step S106. When it is judged in step S105 that the image data for use in the HDR composition processing have not been selected by the user, the processing proceeds to step S107.

In step S106, the controller 118 judges whether or not to make an effect check. For example, when the HDR effect check icon 405 is selected by the user, it is judged that the effect check will be made. When it is judged in step S106 that the effect check will not be made, the processing proceeds to step S107. When it is judged in step S106 that the effect check will be made, the processing proceeds to step S108.

In step S107, the controller 118 judges whether or not a return instruction is issued by the user. For example, when the return icon 406 is selected by the user, it is judged that the return instruction is issued. When it is judged in step S107 that the return instruction is not issued, the processing returns to step S101. When it is judged in step S107 that the return instruction is issued by the user, the processing in FIG. 4 ends.

In step S108, the controller 118 causes the second image processor 106b of the image processor 106 to perform the second composition processing. In response to this instruction, the second image processor 106b composes the image data selected by the user to generate HDR still image data.

Figure 5B:
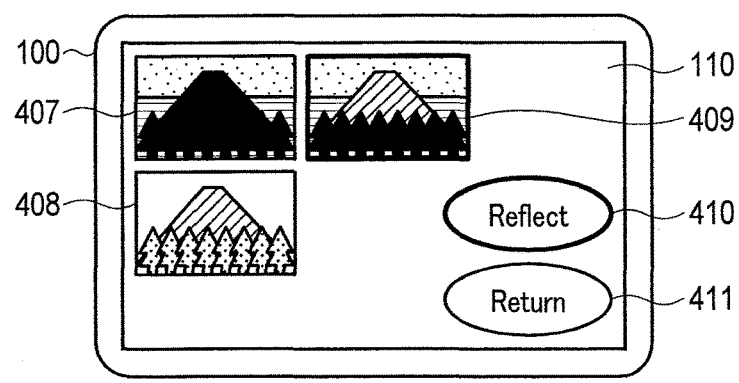
FIG. 5B is a diagram showing an example of comparison display.

In step S109, the controller 118 controls the playback unit 108 to perform comparison display. In response to this instruction, the playback unit 108 displays, on the display 110, a list of reduced images 407 and 408 of the image data used in the HDR composition processing and a reduced image 409 of the image data obtained as a result of the HDR composition processing, for example, as shown in FIG. 5B. Further, the playback unit 108 displays, for example, a reflection icon 410, and a return icon 411. Then the processing proceeds to step S110. Here, the reflection icon 410 is an icon for the user to instruct to reflect the result of the HDR composition processing at the time of the following photography. The return icon 411 is an icon for the user to instruct to return to the screen in FIG. 5A.

In the HDR composition processing, image data having a wide dynamic range can be acquired by the composition of image data different in exposure conditions. Depending on how the image data are selected and how the composition ratio is set here, the finish of composed image data varies.

Figure 6:
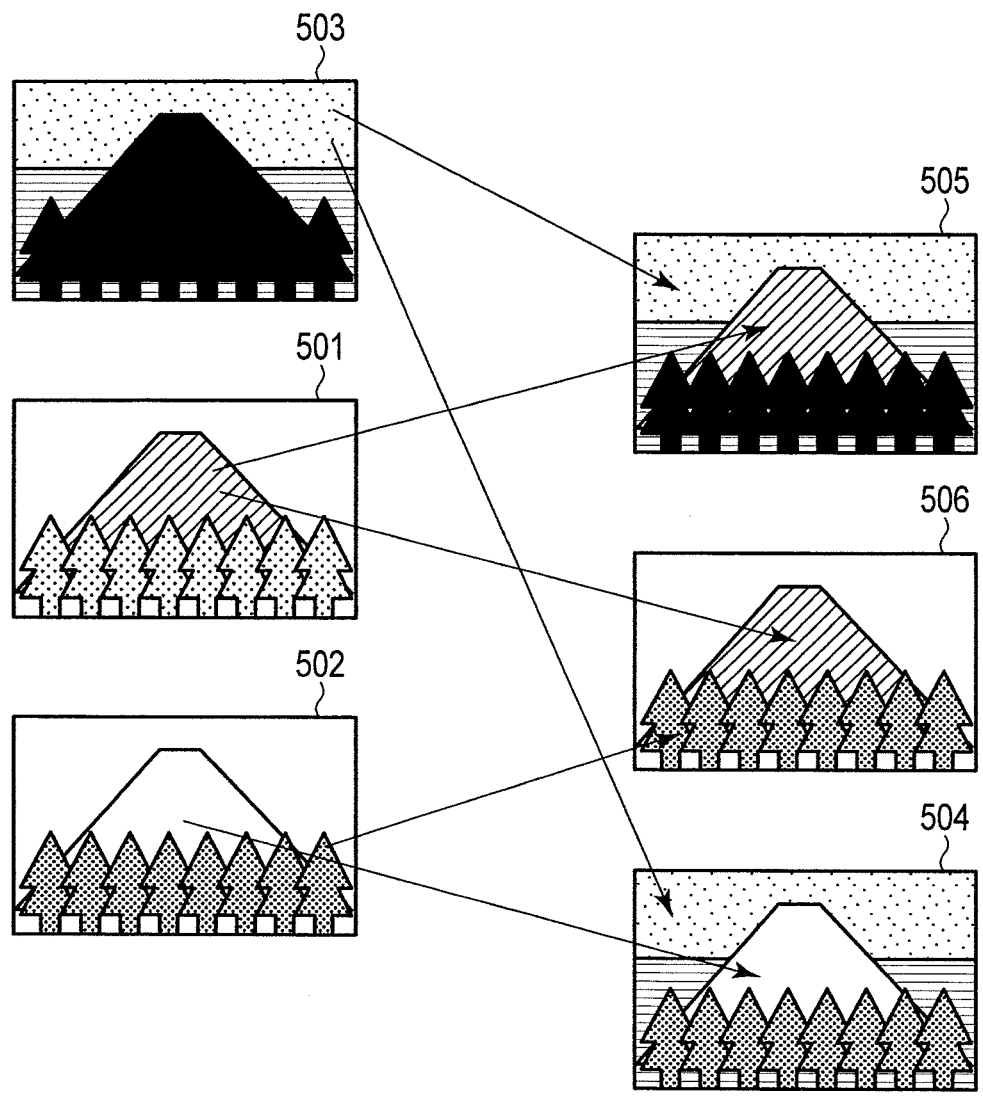
FIG. 6 is a diagram showing an example of HDR composition processing.

The composition of two pieces of image data 501 of normal exposure, image data 502 of overexposure, and image data 503 of underexposure shown in FIG. 6 is shown by way of example. For example, in the HDR composition processing using the image data 502 of overexposure and the image data 503 of underexposure, the second image processor 106b performs composition processing so that a higher composition ratio of the image data 503 of underexposure is set for a saturated sky part of the image data 502 of overexposure and so that a higher composition ratio of the image data 502 of overexposure is set for a tree part of blocked up shadows in the image data 503 of underexposure. As a result of such composition processing, HDR still image data 504 having a dynamic range extended to a high-luminance side and a low-luminance side is generated. In the HDR still image data 504, colors of both the sky part which is a high-luminance part and the tree part which is a low-luminance part can be reproduced at the same time. However, color reproduction of a mountain part which is a medium gradation luminance part is different from color reproduction of a mountain part in the image data of normal exposure.

In the HDR composition processing using the image data 501 of normal exposure and the image data 503 of underexposure, the second image processor 106b performs composition processing so that a higher composition ratio of the image data 501 of normal exposure is set for the mountain part and tree part of blocked up shadows in the image data 503 of underexposure and so that a higher composition ratio of the image data 503 of underexposure is set for the sky part of blown out highlights in the image data 501 of normal exposure. As a result of such composition processing, HDR still image data 505 having a dynamic range extended to the high-luminance side is generated. In the HDR still image data 505, colors of the sky part which is a high-luminance part and relatively bright parts such as the mountain part which is a medium luminance part can be reproduced. However, the tree part which is the low-luminance part has blocked up shadows.

In the HDR composition processing using the image data 501 of normal exposure and the image data 502 of overexposure, the second image processor 106b performs composition processing so that a higher composition ratio of the image data 502 of overexposure is set for the tree part of blocked up shadows in the image data 501, of normal exposure and so that a higher composition ratio of the image data 501 of normal exposure is set for the mountain part of blown out highlights in the image data 502 of overexposure. As a result of such composition processing, HDR still image data 506 having a dynamic range extended to the low-luminance side is generated. In the HDR still image data 506, colors of the tree part which is the low-luminance part and relatively dark parts such as the mountain part which is the medium luminance part can be reproduced. However, a blue sky is not reproduced and has blown out highlights in the sky part which is the high-luminance part.

As above, in the HDR composition processing, the finish of the composed image data varies depending on how the image data are selected. Moreover, the finish of the composed image data also varies by the change of the composition ratio. When the comparison display in FIG. 5B is performed in the effect check, the user can set the composition processing for the HDR still image data while comparing the images before and after the HDR composition processing.

Here, the explanation returns to FIG. 4. In step S110, the controller 118 judges whether or not one of the reduced images is selected by the user. When it is judged in step S110 that one of the reduced images is selected by the user, the processing proceeds to step S111. When it is judged in step S110 that one of the reduced images is not selected by the user, the processing proceeds to step S115.

Figure 5C:
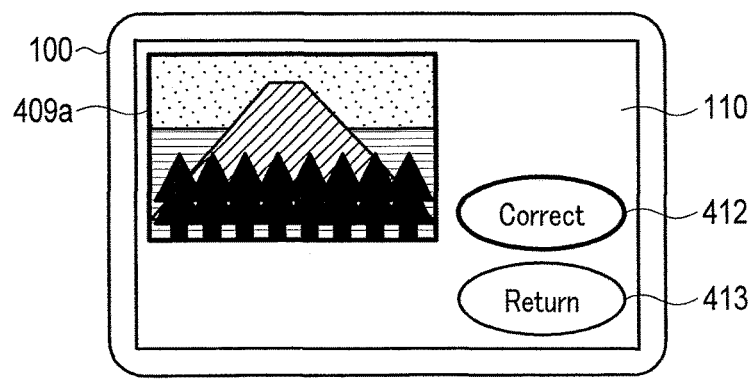
FIG. 5C is a diagram showing an example of enlarged display.

In step S111, the controller 118 instructs the playback unit 108 to perform enlarged display of the selected reduced image. In response to this instruction, the playback unit 108 displays, on the display 110, an enlarged image of the image data corresponding to the selected reduced image, as shown in FIG. 5C. For example, FIG. 5C shows a display example of an enlarged image 409a of the reduced image 409. Further, the playback unit 108 displays, for example, a correction icon 412, and a return icon 413. Then the processing proceeds to step S112. Here, the correction icon 412 is an icon for the user to instruct to correct the result of the HDR composition processing. The return icon 413 is an icon for the user to instruct to return to the screen in FIG. 5B.

In step S112, the controller 118 judges whether or not to make a correction. For example, it is judged that a correction will be made when the user has selected the correction icon 412. When it is judged in step S112 that a correction will not be made, the processing proceeds to step S113. When it is judged in step S112 that a correction will be made, the processing proceeds to step S114.

In step S113, the controller 118 judges whether or not a return instruction is issued by the user. For example, when the return icon 413 is selected by the user, it is judged that the return instruction is issued. When it is judged in step S113 that the return instruction is not issued by the user, the processing proceeds to step S111. In this case, the enlarged display is continued. When it is judged in step S113 that the return instruction is issued by the user, the processing returns to step S108. In this case, the display returns to the display in FIG. 5B. When the correction described in step S114 is made before the return icon 413 is selected, the contents of the correction are also reflected in the display in FIG. 5B.

In step S114, the controller 118 causes the second image processor 106b to make a correction that conforms to the operation by the user. The correction here includes contrast enhancement, saturation enhancement, the addition of special effects by the combination of the above, the change of the composition ratio of the image data for use in the HDR composition processing, and others. As a result of such a correction, the finish of the HDR still image data can be different from the finish of the HDR moving image data. In the present embodiment, both the correction of each of the image data before composition and the correction of the image data after composition can be made. After the end of the correction, the processing returns to step S111. When the correction is made, composition processing is again performed in step S111, and the display is then updated.

In step S115, the controller 118 judges whether or not to reflect the contents of the correction. For example, when the reflection icon 410 is selected by the user, it is judged that the contents of the correction will be reflected. When it is judged in step S115 that the contents of the correction will not be reflected, the processing proceeds to step S116. When it is judged in step S115 that the contents of the correction will be reflected, the processing proceeds to step S117.

In step S116, the controller 118 judges whether or not a return instruction is issued by the user. For example, when the return icon 411 is selected by the user, it is judged that the return instruction is issued. When it is judged in step S116 that the return instruction is not issued by the user, the processing returns to step S108. When it is judged in step S116 that the return instruction is issued by the user, the processing returns to step S101. In this case, image data are again acquired as needed.

In step S117, the controller 118 stores the contents of the correction in, for example, the storage unit 104. Then the processing in FIG. 4 ends. The contents of the correction stored here will be reflected at the time of the recording of the HDR still image during the following HDR moving image photography.

Here, the explanation returns to FIG. 2A and FIG. 2B. In step S7, the controller 118 judges whether or not an instruction to start moving image photography is issued. For example, when the moving image photography icon 306 is selected or the moving image button is operated by the user, it is judged that the instruction to start the moving image photography is issued. When it is judged in step S7 that the instruction to start the moving image photography is issued, the processing proceeds to step S8. When it is judged in step S7 that the instruction to start the moving image photography is not issued, the processing proceeds to step S20.

In step S8, the controller 118 judges whether or not the HDR recording mode is on. When it is judged in step S8 that the HDR recording mode is on, the processing proceeds to step S9. When it is judged in step S8 that the HDR recording mode is not on, the processing proceeds to step S15. Here, on or off of the HDR recording is described in a simple form. In this case, there is an advantage of being able to collectively set the moving image HDR and the still image HDR, so that it is difficult for the user to be confused about the setting. Naturally, HDR modes may be individually settable for the still image and the moving images. HDR processing for the still image and the moving images may be the same. That is, the explanation puts emphasis here on the technique of the imaging apparatus characterized by having the imaging unit which sequentially acquires image data groups comprising image data different in exposure conditions to generate HDR moving image frames, the first image processor which subjects the image data belonging to each of the image data groups to the first composition processing, to generate HDR moving image data comprising HDR moving image frames, and the mode which can subject the image data belonging to each of the image data groups to the second composition processing different from the first composition processing, to generate HDR still image data. However, FIG. 2B illustrates a flow in which the HDR setting can be collectively performed.

In step S9, the controller 118 performs the HDR moving image photography. That is, the controller 118 performs photography by the imaging unit 102 while changing the exposure conditions (e.g. exposure time) so that HDR moving image frames can be generated. The controller 118 then instructs the image processor 106 to generate the HDR moving image frames by the timing in which the image data necessary for the generation of the HDR moving image frames are stored in the storage unit 104. In response to this instruction, the first image processor 106a of the image processor 106 composes the image data stored in the storage unit 104 in accordance with the HDR moving image photography so that the gradation number will be the display gradation number (e.g. 8 bits) of the display 110, thereby generating imaging apparatus HDR moving image frames. The first image processor 106a also composes the image data stored in the storage unit 104 in accordance with the HDR moving image photography so that the gradation number will be the display gradation number (e.g. 10 bits) of the television 200, thereby generating television HDR moving image frames. Then the processing proceeds to step S10.

In step S10, the controller 118 judges whether or not an instruction to end the moving image photography is issued. For example, when the moving image photography icon 306 is again selected or the moving image button is again operated by the user, it is judged that the instruction to end the moving image photography is issued. When it is judged in step S10 that the instruction to end the moving image photography is not issued, the processing proceeds to step S11. When it is judged in step S10 that the instruction to end the moving image photography is issued, the processing proceeds to step S14.

In step S11, the controller 118 judges whether or not to perform HDR still image recording. Whether or not to perform the HDR still image recording is judged by the setting performed in step S6. There are various possible recording timings of the HDR still image during the moving image photography to be set by the user in step S6; for example, only the timing in which an instruction to record the still image is issued by the user, and always (simultaneously with the generation of the HDR moving image frames). When it is judged in step S11 that the HDR still image recording will be performed, the processing proceeds to step S12. When it is judged in step S11 that the HDR still image recording will not be performed, the processing returns to step S9.

In step S12, the controller 118 instructs the image processor 106 to generate an imaging apparatus HDR still image file. In response to this instruction, the second image processor 106b of the image processor 106 composes the image data stored in the storage unit 104 in accordance with the HDR moving image photography so that the gradation number will be the display gradation number (e.g. 8 bits) of the display 110, thereby generating imaging apparatus HDR still image data. Then the record processor 106c generates an imaging apparatus HDR still image file from the imaging apparatus HDR still image data, and records the generated imaging apparatus HDR still image file in the recording unit 112. Then the processing proceeds to step S13.

In step S13, the controller 118 instructs the image processor 106 to generate a television HDR still image file. In response to this instruction, the second image processor 106b of the image processor 106 composes the image data stored in the storage unit 104 in accordance with the HDR moving image photography so that the gradation number will be the display gradation number (e.g. 10 bits) of the television 200, thereby generating television HDR still image data. Then the record processor 106c generates an HDR still image file from the television HDR still image data, and records the generated television HDR still image file in the recording unit 112. Then the processing returns to step S9.

In step S14, the controller 118 instructs the image processor 106 to generate an HDR moving image file. In response to this instruction, the record processor 106c of the image processor 106 generates an imaging apparatus HDR moving image file from the imaging apparatus HDR moving image frames stored in the storage unit 104 during the HDR moving image photography, and also generates a television HDR moving image file from the television HDR moving image frames stored in the storage unit 104 during the HDR moving image photography, and records the generated imaging apparatus HDR moving image file and television HDR moving image file in the recording unit 112. Then the processing returns to step S3.

Figure 7:
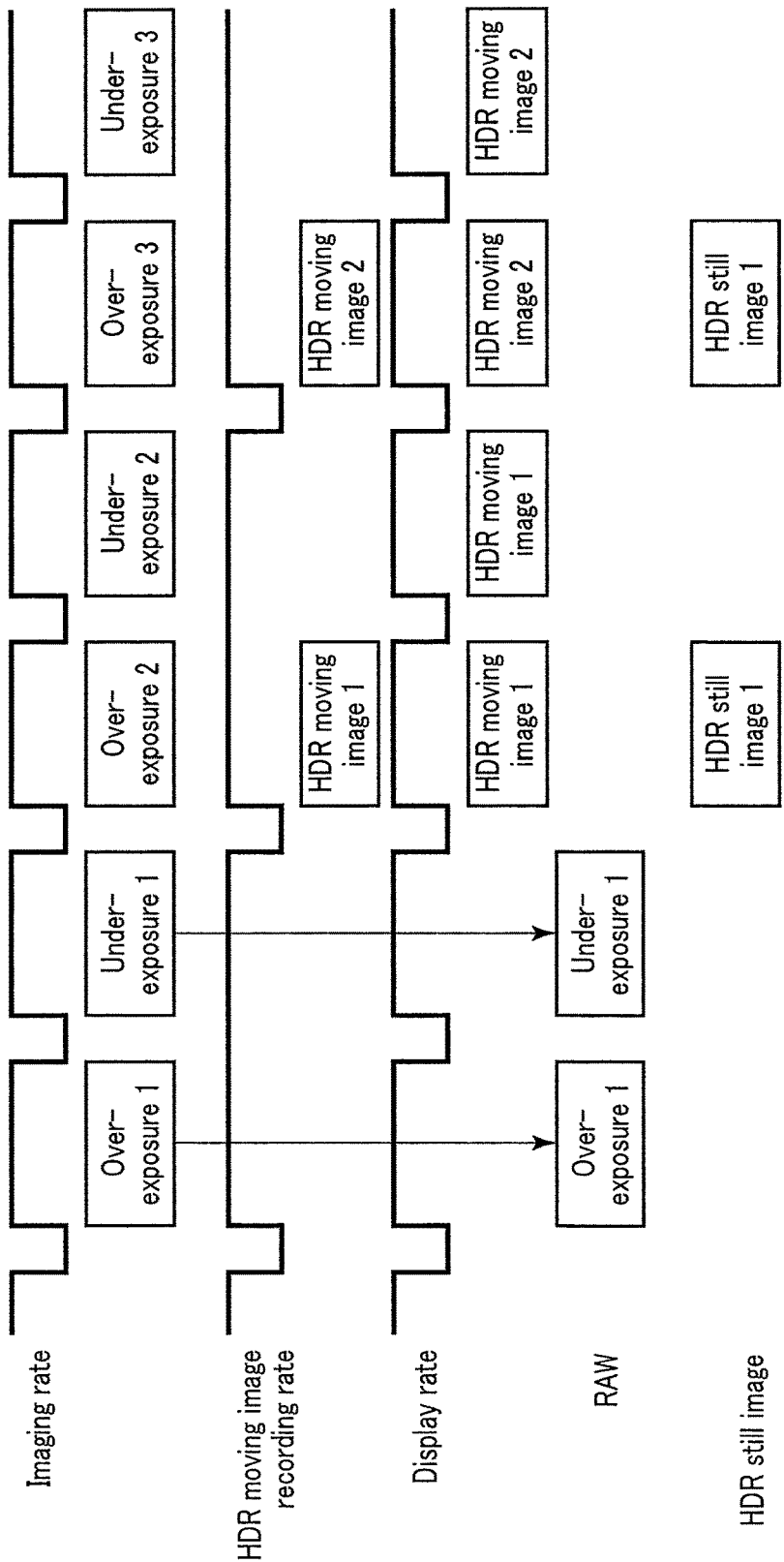
FIG. 7 is a timing chart showing processing of HDR moving image photography involving HDR still image recording.

Processing of HDR moving image photography involving HDR still image recording is described below. FIG. 7 is a timing chart showing the processing of the HDR moving image photography involving the HDR still image recording.

When the HDR moving image photography is started, the controller 118 controls the imaging unit 102 so that image data groups comprising image data different in exposure conditions to generate HDR moving image frames will be sequentially generated at a predetermined imaging rate (e.g. 60 fps). As the number of image data and the exposure difference included in the image data groups, the controller 118 uses, if any, values set by the user in the effect check, or uses predetermined values (e.g. one step) if there are no values set by the user. In FIG. 7, two pieces of image data: image data of overexposure and image data of underexposure are preset for use in the generation of the HDR moving image frames. In this case, the controller 118 controls the imaging unit 102 so that imaging under the condition of overexposure and imaging under the condition of underexposure will be repeated at the predetermined imaging rate.

After the start of the HDR moving image photography, the controller 118 instructs the image processor 106 to generate HDR moving image frames whenever imaging is performed twice by the imaging unit 102. Accordingly, the first image processor 106a of the image processor 106 subjects the two pieces of image data stored in the storage unit 104 to the first composition processing, to generate HDR moving image frames (imaging apparatus HDR moving image frames and television HDR moving image frames). In the first composition processing, the correction contents stored in the storage unit 104 as the result of the effect check are not used.

After the generation of the HDR moving image frames, the record processor 106c stores the generated HDR moving image frames in, for example, the storage unit 104. After the end of the HDR moving image photography, the record processor 106c generates HDR moving image files (an imaging apparatus HDR moving image file and a television HDR moving image file) from the generated HDR moving image frames, and records the generated HDR moving image files in, for example, the recording unit 112. Here, in the example of FIG. 7, the HDR moving image frames are recorded whenever imaging is performed twice by the imaging unit 102. Therefore, at the time of the playback of the HDR moving image files, the same HDR moving image file is played back during a display period of two frames, as shown in FIG. 7.

FIG. 8A is a diagram showing the structure of the HDR moving image file. As shown in FIG. 8A, an HDR moving image file 601 has HDR moving image data 602 and tag information 603.

The HDR moving image data 602 is data comprising compressed HDR moving image frames 602a. If the HDR moving image file is an imaging apparatus HDR moving image file, the HDR moving image data 602 is compressed imaging apparatus HDR moving image data. If the HDR moving image file is a television HDR moving image file, the HDR moving image data 602 is compressed television HDR moving image data.

The tag information 603 has file information such as a file name of the HDR moving image file 601. The tag information 603 also has associated information 603a including information (—e.g. a file name) to identify the HDR still image file to be associated with each of the HDR moving image frames, and information (e.g. a file name) to identify the HDR moving image file associated with the HDR moving image file 601. If the HDR moving image file is an imaging apparatus HDR moving image file, the associated information 603a includes information to identify the associated imaging apparatus HDR still image file and information to identify the associated television HDR moving image file. If the HDR moving image file is a television HDR moving image file, the associated information 603a includes information to identify the associated television HDR still image file and information to identify the associated imaging apparatus HDR moving image file.

When the timing of the HDR still image recording has come during the HDR moving image photography, the controller 118 instructs the image processor 106 to generate HDR still image data. FIG. 7 shows an example in which the timing of the HDR still image recording arrives by the timing of the imaging of an HDR moving image frame 1. In this case, the second image processor 106b uses image data 1 of overexposure and image data 1 of underexposure to generate HDR still image data (imaging apparatus HDR still image data and television HDR still image data). Here, in the second composition processing, the correction contents stored in the storage unit 104 as the result of the effect check are reflected. Therefore, HDR still image frames are image data having an image expression different from that of the HDR moving image data.

After the generation of the HDR still image data, the record processor 106*c* generates HDR still image files (an imaging apparatus HDR still image file and a television HDR still image file) from the generated HDR moving image frames. After the generation of the HDR still image files, the record processor 106*c* records the generated HDR still image files in the recording unit 112.

Figure 8B:
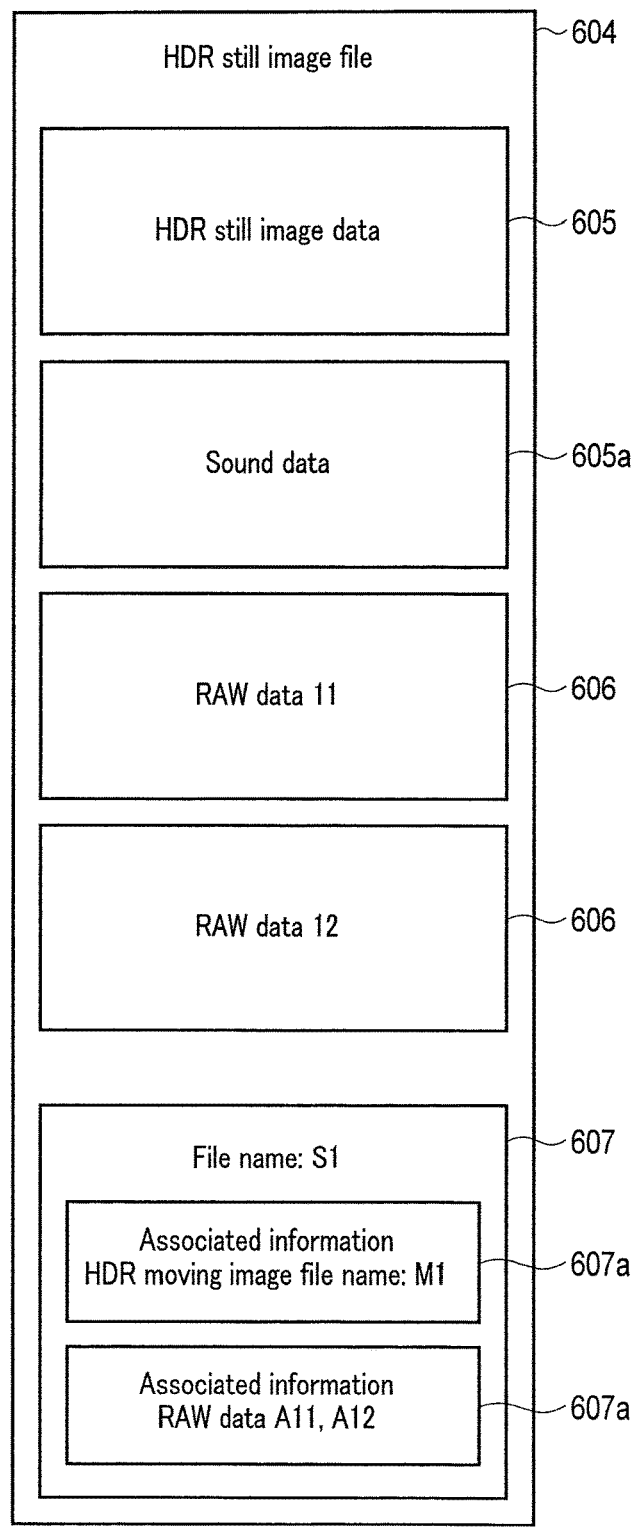
FIG. 8B is a diagram showing the structure of an imaging apparatus HDR still image file.

FIG. 8B is a diagram showing the structure of the HDR still image file. As shown in FIG. 8B, an HDR still image file 604 has HDR still image data 605, RAW data 606, and tag information 607. As above, if the image data different in exposure conditions are recorded in an uncompressed or reversibly compressed form such as RAW or TIFF, characteristics of a display device and viewer's preference are input so that these can be reflected in a composition method, which enables composition that takes into account the difference of devices and the viewer's preference and intention to be performed in accordance with each playback situation. That is, high-speed image compression suitable to moving images can be performed in the imaging unit which sequentially acquires image data groups comprising image data different in exposure conditions, and the first image processor which subjects the image data belonging to each of the image data groups to the first composition processing, to generate HDR moving image data comprising HDR moving image frames, whereas the image data belonging to each of the image data groups are subjected to the second composition processing which is different from the first composition processing and which is appropriate for still image expression so that HDR still image data can be generated. While the still image may also be intended for printing, having characteristics suited to the characteristics of a printer if necessary, for example, is also important, and it is also possible to meet such needs. RAW data or TIFF data different in exposure shown in FIG. 7 may be recorded as files, and an HDR still image 1 may also be recorded as a file.

The HDR still image data 605 is compressed HDR still image data. If the HDR still image file is an imaging apparatus HDR still image file, the HDR still image data 605 is compressed imaging apparatus HDR still image data. If the HDR still image file is a television HDR still image file, the HDR still image data 605 is compressed television HDR still image data. The television file cannot be enjoyed without sound, so that, for example, sound data 605*a* obtained at the time of moving image recording may be contained in the file. As a result, even when this file is played back on a television or the like, it is possible to enjoy image viewing together with sound.

The RAW data 606 is data in which the image data used for the generation of the HDR still image data is recorded in the RAW format. The RAW data 606 is high in the degree of freedom in an image-processing process, and can be invariable between the imaging apparatus HDR still image file and the television HDR still image file.

The tag information 607 has file information such as a file name of the HDR still image file 604. The tag information 607 also has associated information 607*a* including information (e.g. a file name) to identify the HDR moving image file to be associated, and positional information (e.g. a start address of the RAW data 606, and a data amount from a start address of the file to the start address of the RAW data 606) of the RAW data 606 to access the RAW data 606. If the HDR still image file is an imaging apparatus HDR still image file, the associated information 607*a* includes information to identify the associated imaging apparatus HDR moving image file. If the HDR still image file is a television HDR still image file, the associated information 607*a* includes information to identify the associated television HDR moving image file.

Here, FIG. 85 shows an example in which the RAW data 606 is recorded in the HDR still image file 604. However, the RAW data 606 may be recorded in a RAW file different from the imaging apparatus HDR still image file 604. In this case, the RAW file also needs to have information to identify the HDR moving image file and the HDR still image file to be associated with each other.

In the example shown in FIG. 8A and FIG. 8B, the HDR moving image data and the HDR still image data are recorded in separate files. In contrast, as shown in FIG. 9, the HDR moving image data and the HDR still image data may be recorded in one file. An HDR moving image file 701 in FIG. 9 has imaging apparatus HDR moving image data 702, television HDR moving image data 703, imaging apparatus HDR still image data 704, television HDR still image data 705, RAW data 706, and tag information 707. Positional information (e.g. a start address of each data, and a data amount from a start address of the file to the start address of each data) of each data to access each data in the file is recorded in associated information 707*a* of the tag information 707.

Here, the explanation returns to FIG. 2A and FIG. 2B. In step S15 in the case where it is judged in step S8 that the HDR recording mode is not on, the controller 118 performs normal moving image photography. That is, the controller 118 performs imaging by the imaging unit 102 without changing exposure conditions. The controller 118 then instructs the image processor 106 to generate moving image frames every imaging. In response to this instruction, the first image processor 106*a* of the image processor 106 generates normal moving image frames from the image data stored in the storage unit 104 in accordance with the normal moving image photography. Then the processing proceeds to step S16.

In step S16, the controller 118 judges whether or not an instruction to end the moving image photography is issued. For example, when the moving image photography icon 306 is again selected or the moving image button is again operated by the user, it is judged that the instruction to end the moving image photography is issued. When it is judged in step S16 that the instruction to end the moving image photography is not issued, the processing proceeds to step S17. When it is judged in step S16 that the instruction to end the moving image photography is issued, the processing proceeds to step S19.

In step S17, the controller 118 judges whether or not to perform normal still image recording. Whether or not to perform the normal still image recording may be judged in the same manner as the HDR still image recording. When it is judged in step S17 that the normal still image recording will be performed, the processing proceeds to step S18. When it is judged in step S17 that the normal still image recording will not be performed, the processing returns to step S15.

In step S18, the controller 118 instructs the image processor 106 to generate a normal still image file. In response to this instruction, the second image processor 106*b* of the image processor 106 generates normal still image data from the image data stored in the storage unit 104 in accordance with the normal moving image photography. Then the record processor 106c generates a normal still image file from the normal still image data, and records the generated normal still image file in the recording unit 112. Then the processing returns to step S15. The normal still image file is different from the HDR still image file shown in FIG. 8B in that the still image data to be recorded is normal still image data.

In step S19, the controller 118 instructs the image processor 106 to generate a normal moving image file. In response to this instruction, the record processor 106c of the image processor 106 generates a normal moving image file from the moving image frames stored in the storage unit 104 during the normal moving image photography, and records the generated normal moving image file in the recording unit 112. Then the processing returns to step S3. The normal moving image file is different from the HDR moving image file shown in FIG. 8A in that the moving image data to be recorded is normal moving image data.

In step S20 in the case where it is judged in step S7 that the instruction to start the moving image photography is not issued, the controller 118 judges whether or not an instruction to start still image photography is issued. For example, when the still image photography icon 307 is selected or the release button is operated by the user, it is judged that the instruction to start the still image photography is issued. When it is judged in step S20 that the instruction to start the still image photography is issued, the processing proceeds to step S21. When it is judged in step S20 that the instruction to start the still image photography is not issued, the processing proceeds to step S23.

In step S21, the controller 118 performs normal still image photography. That is, the controller 118 performs imaging once by the imaging unit 102 in accordance with the exposure conditions set in step S6. Then the processing proceeds to step S22.

In step S22, the controller 118 instructs the image processor 106 to generate still image data. In response to this instruction, the second image processor 106b of the image processor 106 generates normal still image data from the image data stored in the storage unit 104 by the normal still image photography. After the generation of the normal still image data, the record processor 106c records the generated normal still image file in the recording unit 112. Then the processing returns to step S3.

In step S23, the controller 118 judges whether or not a return instruction is issued by the user. For example, when the return icon 308 is selected by the user, it is judged that the return instruction is issued. When it is judged in step S23 that the return instruction is not issued by the user, the processing returns to step S3. When it is judged in step S23 that the return instruction is issued by the user, the processing returns to step S1.

In step S24 in the case where it is judged in step S2 that the operation mode is not the photography mode, the controller 118 performs processing other than that of the photography mode. After the other processing, the processing returns to step S1.

Figure 10A:
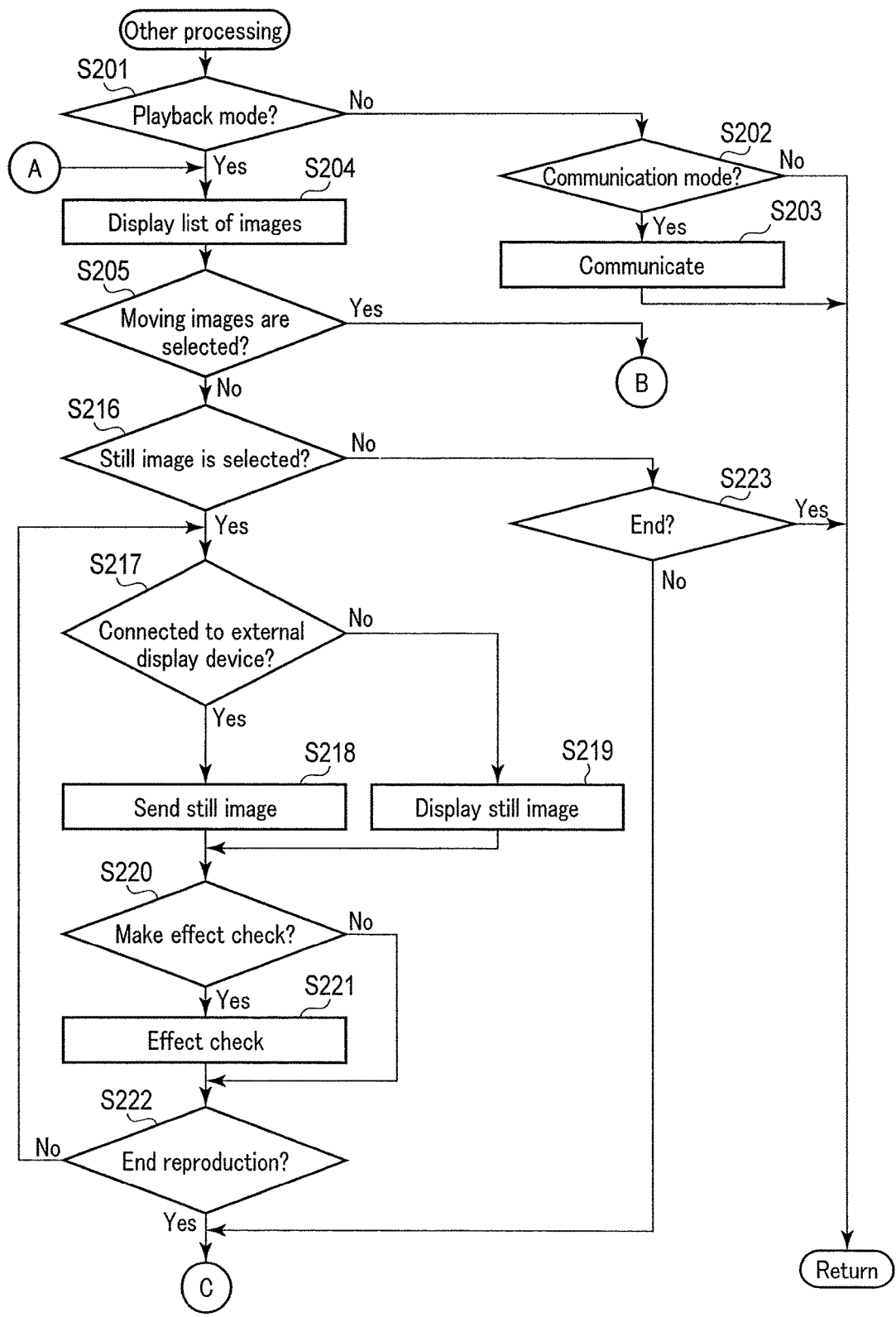
FIG. 10A is a flowchart showing other processing.
Figure 10B:
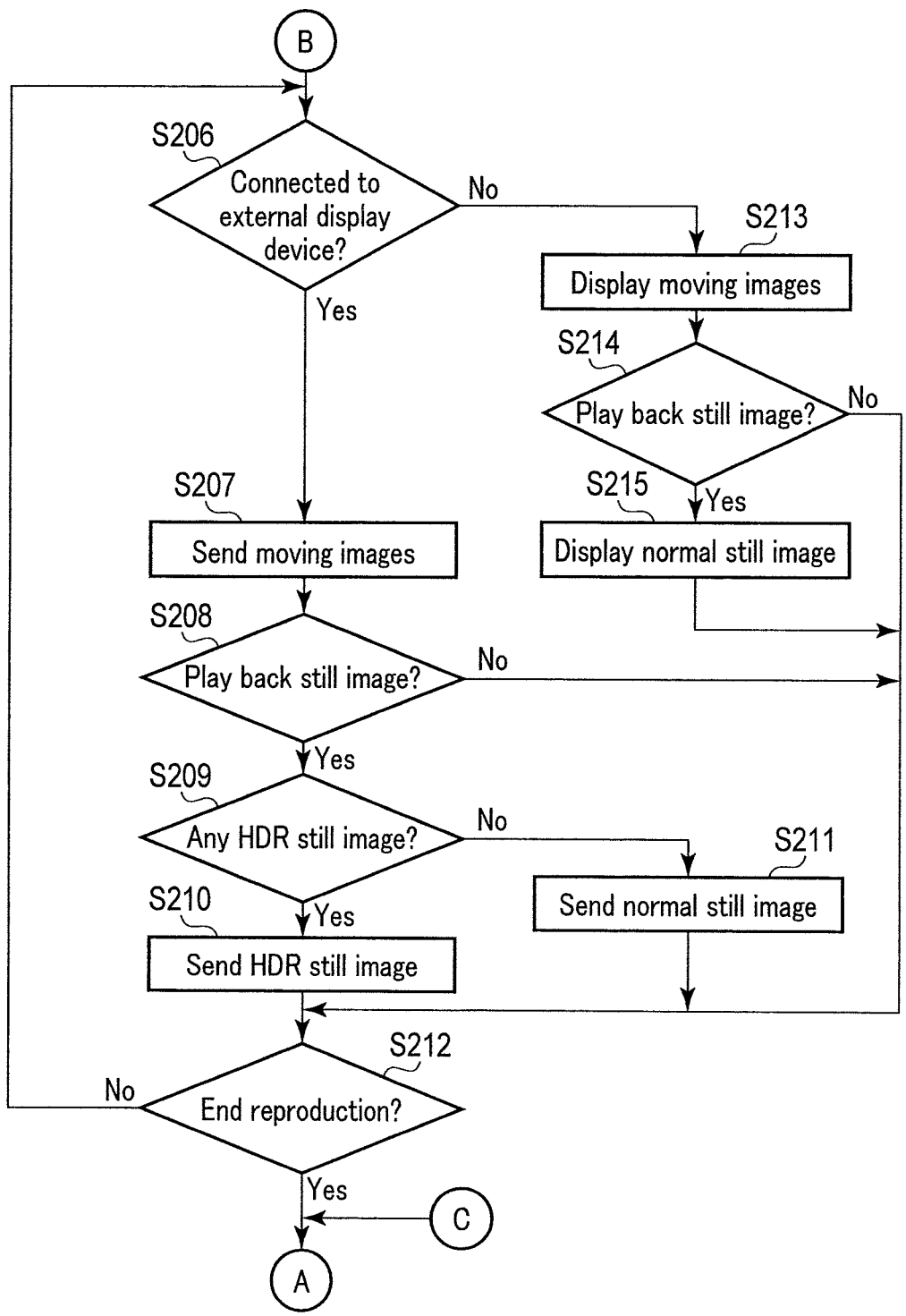
FIG. 10B is a flowchart showing the other processing.

FIG. 10A and FIG. 10B are flowcharts showing the other processing. In step S201, the controller 118 judges whether or not the current operation mode is the playback mode. When it is judged in step S201 that the operation mode of the imaging apparatus 100 is not the playback mode, the processing proceeds to step S202. When it is judged in step S201 that the operation mode of the imaging apparatus 100 is the playback mode, the processing proceeds to step S204.

In step S202, the controller 118 judges whether or not the current operation mode is the communication mode. When it is judged in step S202 that the operation mode of the imaging apparatus 100 is the communication mode, the processing proceeds to step S203. When it is judged in step S202 that the operation mode of the imaging apparatus 100 is not the communication mode, the processing in FIG. 10A and FIG. 10B ends. In this case, the processing returns to step S1 in FIG. 2A.

In step S203, the controller 118 performs the processing of the communication mode. In the processing of the communication mode, the controller 118 controls the communication unit 114 to perform such processing as to send the image file recorded in the recording unit 112 to an external device or receive the image file recorded in the external device. After the processing of the communication mode, the processing in FIG. 10A and FIG. 10B ends. In this case, the processing returns to step S1 in FIG. 2A.

In step S204, the controller 118 controls the playback unit 108 to display a list of the image files recorded in the recording unit 112. In response to this instruction, the playback unit 108 displays, on the display 110, for example, thumbnail images showing the list of the image files recorded in the recording unit 112. Then the processing proceeds to step S205.

In step S205, the controller 118 judges whether or not a moving image file is selected from the displayed list by the user. When it is judged in step S205 that a moving image file is selected by the user, the processing proceeds to step S206. When it is judged in step S205 that a moving image file is not selected by the user, the processing proceeds to step S216.

In step S206, the controller 118 judges whether or not the imaging apparatus 100 is connected to an external display device (e.g. the television 200). When it is judged in step S206 that the imaging apparatus 100 is connected to the external display device, the processing proceeds to step S207. When it is judged in step S206 that the imaging apparatus 100 is not connected to the external display device, the processing proceeds to step S213.

Figure 11:
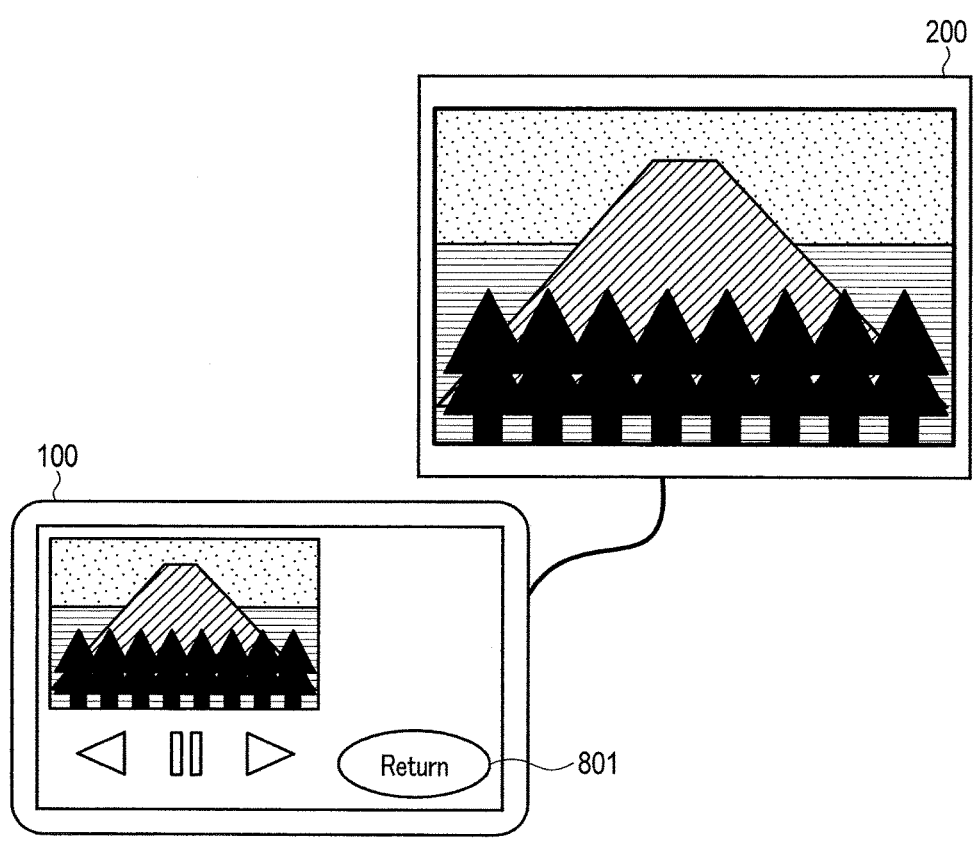
FIG. 11 is a diagram showing an example of playback of an image in an external display device.

In step S207, the controller 118 instructs the playback unit 108 to send the moving image frames corresponding to the selected moving image file to the external display device. Accordingly, the first playback processor 108a of the playback unit 108 sends the moving image frames to the television 200 which is the external display device via the communication unit 114. Consequently, in the television 200 which is the external display device, for example, HDR moving images are played back as shown in FIG. 11. When a television HDR moving image file is associated with the selected moving image file, the first playback processor 108a may send television HDR moving image frames to the television 200 which is the external display device via the communication unit 114. Consequently, HDR display corresponding to the specifications of the television 200 is performed. Moreover, when the television 200 is not compatible with the HDR display, the first playback processor 108a may send imaging apparatus HDR moving image frames to the television 200 which is the external display device via the communication unit 114.

In step S208, the controller 118 judges whether or not it is the timing of playing back a still image. For example, when there is still image data (HDR still image data or normal still image data) associated with the moving image frames being played back, it is judged that it is the timing of playing back the still image. When it is judged in step S208 that it is the timing of playing back the still image, the processing proceeds to step S209. When it is judged in step S208 that it is not the timing of playing back the still image, the processing proceeds to step S212.

In step S209, the controller 118 judges whether or not the HDR still image data is associated with the moving image frames being played back. When it is judged in step S209 that the HDR still image data is associated with the moving image frames being played back, the processing proceeds to step S210. When it is judged in step S209 that the HDR still image data is not associated with the moving image frames being played back, the processing proceeds to step S211.

In step S210, the controller 118 instructs the playback unit 108 to send the HDR still image data associated with the moving image frames being played back to the external display device. Accordingly, the second playback processor 108b of the playback unit 108 sends the HDR still image data to the television 200 which is the external display device via the communication unit 114. Consequently, in the television 200 which is the external display device, an HDR still image is played back. The HDR still image may be played back after the end of the playback of the moving image frames, or may be reduced in size and then played back over the moving image frames being played back. When a television HDR moving image file is associated with the selected moving image file, the second playback processor 108b may send television HDR still image data to the television 200 which is the external display device via the communication unit 114. Consequently, HDR display corresponding to the specifications of the television 200 is performed. Moreover, when the television 200 is not compatible with the HDR display, the second playback processor 108b may send imaging apparatus HDR still image data to the television 200 which is the external display device via the communication unit 114.

In step S211, the controller 118 instructs the playback unit 108 to send the normal still image data associated with the moving image frames being played back to the external display device. Accordingly, the second playback processor 108b of the playback unit 108 sends the normal still image data to the television 200 which is the external display device via the communication unit 114. Consequently, in the television 200 which is the external display device, a normal still image is played back. The normal still image may be played back after the end of the playback of the moving image frames, or may be reduced in size and then played back over the moving image frames being played back.

In step S212, the controller 118 judges whether or not an instruction to end the playback of the moving images is issued. For example, when a return icon 801 shown in FIG. 11 is selected, it is judged that the instruction to end the playback of the moving images is issued. When it is judged in step S212 that the instruction to end the playback of the moving images is not issued, the processing returns to step S206. When it is judged in step S212 that the instruction to end the playback of the moving images is issued, the processing returns to step S204.

In step S213 in the case where it is judged in step S206 that the imaging apparatus 100 is not connected to the external display device, the controller 118 instructs the playback unit 108 to display the moving image frames corresponding to the selected moving image file on the display 110. Accordingly, the first playback processor 108a of the playback unit 108 displays the moving image frames on the display 110. When an imaging apparatus HDR moving image file is associated with the selected moving image file, the first playback processor 108a may display imaging apparatus HDR moving image frames on the display 110. Consequently, HDR display corresponding to the specifications of the display 110 is performed.

In step S214, the controller 118 judges whether or not it is the timing of playing back a still image. For example, when there is still image data associated with the moving image frames being played back, it is judged that it is the timing of playing back the still image. When it is judged in step S214 that it is the timing of playing back the still image, the processing proceeds to step S215. When it is judged in step S214 that it is not the timing of playing back the still image, the processing proceeds to step S212.

In step S215, the controller 118 instructs the playback unit 108 to display, on the display 110, a still image associated with the moving image frames being played back. Accordingly, the second playback processor 108b of the playback unit 108 displays the still image on the display 110. Consequently, the still image is played back on the display 110. When an imaging apparatus HDR still image file is associated with the selected moving image file, the second playback processor 108b may display an imaging apparatus HDR still image on the display 110. Consequently, HDR display corresponding to the specifications of the display 110 is performed.

In step S216 in the case where it is judged in step S205 that a moving image file is not selected by the user, the controller 118 judges whether or not a still image file is selected from the displayed list by the user. When it is judged in step S216 that a still image file is selected by the user, the processing proceeds to step S217. When it is judged in step S216 that a still image file is not selected by the user, the processing proceeds to step S223.

In step S217, the controller 118 judges whether or not the imaging apparatus 100 is connected to an external display device (e.g. the television 200). When it is judged in step S217 that the imaging apparatus 100 is connected to the external display device, the processing proceeds to step S218. When it is judged in step S217 that the imaging apparatus 100 is not connected to the external display device, the processing proceeds to step S219.

In step S218, the controller 118 instructs the playback unit 108 to send, to the external display device, the still image data (HDR still image data or normal still image data) included in the selected still image file. Accordingly, the second playback processor 108b of the playback unit 108 sends the still image data to the television 200 which is the external display device via the communication unit 114. Consequently, in the television 200 which is the external display device, a still image is played back.

In step S219, the controller 118 instructs the playback unit 108 to play back, on the display 110, the still image data (HDR still image data or normal still image data) included in the selected still image file. Accordingly, the second playback processor 108b of the playback unit 108 displays the still image on the display 110.

In step S220, the controller 118 judges whether or not to make an effect check. For example, when RAW data is associated with the selected still image file and the HDR effect check icon displayed on the display 110 during the playback of the still image is selected, it is judged that the effect check will be made. When it is judged in step S220 that the effect check will be made, the processing proceeds to step S221. When it is judged in step S220 that the effect check will not be made, the processing proceeds to step S222.

In step S221, the controller 118 performs the processing of the effect check. The processing of the effect check is substantially the same as the processing in FIG. 4 described above. In the effect check in the photography mode, image data for the effect check is acquired by imaging. In contrast, in the effect check in the playback mode, image data for the effect check is the RAW data associated with the selected still image file. In the effect check in the playback mode, image data other than the RAW data associated with the selected still image file can also be used as the image data for the effect check. That is, in the effect check in the playback mode, image data which do not belong to the same image data group can also be used as the image data for the effect check. After the end of the effect check, the processing proceeds to step S222.

In step S222, the controller 118 judges whether or not an instruction to end the playback of the still image is issued. When it is judged in step S222 that the instruction to end the playback of the still image is not issued, the processing returns to step S217. When it is judged in step S222 that the instruction to end the playback of the still image is issued, the processing returns to step S204.

In step S223, the controller 118 judges whether or not to end the processing in the playback mode. For example, when a return instruction is issued by the user during the display of the list, it is judged that the processing in the playback mode will be ended. When it is judged in step S223 that the processing in the playback mode will not be ended, the processing returns to step S204. When it is judged in step S223 that the processing in the playback mode will be ended, the processing in FIG. 10A and FIG. 10B ends. In this case, the processing returns to step S1 in FIG. 2A.

As described above, in the present embodiment, when the HDR still image is recorded during the HDR moving image photography, HDR still image data is generated by image processing different from that for the generation of the HDR moving image frames. As a result, the image expression of the HDR still image which is played back during the playback of the HDR moving images can be different from that of the HDR moving images, whereby the HDR moving images can be more attractive contents.

In the present embodiment, each of the HDR moving image data and the HDR still image data is generated for the television and the imaging apparatus. It is thus possible to achieve both display suited to the specifications of the display 110 of the imaging apparatus and display suited to the specifications of the television 200. This enables, when the characteristic of the display is different, display that suits to each characteristic. While the still image may also be intended for printing, it is also possible to adapt to characteristics suited to the characteristics of a printer.

In the present embodiment, when the HDR still image is recorded during the HDR moving image photography, the image data used for the generation of the HDR still image data is recorded in the RAW format. Therefore, an HDR still image having different effects can be generated after photography. The imaging unit which sequentially acquires image data groups comprising pieces of image data different in exposure conditions is provided, and there are provided the first image processor which subjects the pieces of image data belonging to each of the image data groups to the first composition processing to generate HDR moving image data comprising HDR moving image frames, and the recording unit capable of recording image data for still images so that the pieces of the image data belonging to each of the image data groups are subjected to the second composition processing different from the first composition processing, to generate HDR still image data. It is therefore possible to display images having not only expressions suited to the form of output but also expressions suited to the characteristics of the output device and user's demands. In the case of the still image, the display may be checked in detail, and having such a degree of freedom is preferable. The still image is also adaptable to printer-compatible image processing.

While the present invention has been described above on the basis of the embodiment, the present invention is not limited to the embodiment described above. In the technique according to the present embodiment, the HDR moving image photography can be replaced with HDR throughimage display. In this case, an HDR still image generated by the timing specified by the user during the HDR throughimage display is subjected to, for example, contrast enhancement different from that of HDR moving image frames so that the visibility of a still image acquired by the timing which the user desires can be improved. That is, the moving images preferably have frame expressions originating from image processing for smooth response and transition in the change of situation, but the still image obtained during the response and transition needs to have an appropriate expression and visibility by itself regardless of the preceding and subsequent frames. When such a situation is considered, it goes without saying that changing the method of composing frames that can be used in both moving images and still images to change visibility and image expressions is important. The composition method may be capable of reflecting the characteristics of a display device, the characteristics of a printing device, and viewer's preference that are input thereto, so that composition which takes into account the difference of devices and the viewer's preference and intention can be performed. Such processing is applicable to imaging apparatuses such as an endoscope device, a microscope device, and a monitoring device.

Each process according to the embodiment described above can also be stored as a program executable by the controller 118 which is a computer. Otherwise, each process according to the embodiment described above can be stored and distributed in a recording medium of an external storage device such as a magnetic disk, an optical disk, or a semiconductor memory. The controller 118 then reads the program stored in the recording medium of the external storage device, and the operation of the controller 118 is controlled by the read program, whereby the controller 118 can execute the processes described above. As applicability, whether or not the result of display is satisfactory can be input by manual operation, biological determination, or the like so that the user's taste will be learned accordingly. That is, control that cooperates with artificial intelligence may be used. In this case, similar advantageous effects can be obtained without even a step-by-step program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An imaging apparatus comprising:
an imaging unit which sequentially acquires image data groups comprising pieces of image data different in exposure conditions to generate HDR moving image frames;
a first image processor which subjects the pieces of the image data belonging to each of the image data groups to first composition processing, to generate HDR moving image data comprising HDR moving image frames; and a second image processor which subjects pieces of image data belonging to each of the image data groups or pieces of image data that do not belong to the image data groups to second composition processing different from the first composition processing, to generate HDR still image data, wherein the pieces of the image data subjected to the second composition processing are composed with a composition ratio different from a composition ratio with which the pieces of the image data subjected to the first composition processing are composed.

2. The imaging apparatus according to claim 1, further comprising a record processor which records the HDR moving image data and the HDR still image data in association with each other in a recording unit.

3. The imaging apparatus according to claim 1, further comprising a record processor to record the image data, which have been used to generate the HDR still image data, in a recording unit in a RAW format in association with the HDR still image data.

4. The imaging apparatus according to claim 1, further comprising:
 a display which displays images; and
 a communication unit to communicate with an external display device which displays images,
 wherein the second image processor generates, as the HDR still image data, at least one of (i) first HDR still image data having a gradation number equal to a display gradation number of the display, and (ii) second HDR still image data having a gradation number equal to a display gradation number of the external display device.

5. The imaging apparatus according to claim 1, wherein the second composition processing further includes at least one of (i) processing to enhance a contrast and a saturation of the pieces of the image data subjected to the second composition processing, and (ii) processing to enhance a contrast and a saturation of the HDR still image data.

6. The imaging apparatus according to claim 1, wherein the HDR still image data is played back after playback of corresponding HDR moving image frames or is played back over the corresponding HDR moving image frames.

7. An imaging method comprising:
sequentially acquiring, by an imaging unit, image data groups comprising pieces of image data different in exposure conditions to generate HDR moving image frames;
subjecting the pieces of the image data belonging to each of the image data groups to first composition processing, to generate HDR moving image data comprising HDR moving image frames; and
subjecting the pieces of the image data belonging to each of the image data groups or pieces of image data that do not belong to the image data groups to second composition processing different from the first composition processing, to generate HDR still image data,
wherein the pieces of the image data subjected to the second composition processing are composed with a composition ratio different from a composition ratio with which the pieces of the image data subjected to the first composition processing are composed.

8. An imaging apparatus comprising:
a display;
a communication unit to communicate with an external display device;
an imaging unit which sequentially acquires image data groups comprising pieces of image data different in exposure conditions to generate HDR moving image frames;
a first image processor which subjects the pieces of the image data belonging to each of the image data groups to first composition processing, to generate HDR moving image data comprising HDR moving image frames; and
a second image processor which subjects pieces of image data belonging to each of the image data groups or pieces of image data that do not belong to the image data groups to second composition processing different from the first composition processing, to generate at least one of (i) first HDR still image data having a gradation number equal to a display gradation number of the display, and (ii) second HDR still image data having a gradation number equal to a display gradation number of the external display device.

* * * * *